(12) United States Patent
Samain et al.

(10) Patent No.: US 10,849,406 B2
(45) Date of Patent: Dec. 1, 2020

(54) SYSTEM FOR DISPENSING AT LEAST ONE MAKEUP PRODUCT AND METHOD FOR DISPENSING AND EVALUATING MAKEUP

(71) Applicant: L'OREAL, Paris (FR)

(72) Inventors: Henri Samain, Chevilly Larue (FR); Franck Giron, Chevilly Larue (FR)

(73) Assignee: L'OREAL, Paris (FR)

( * ) Notice: Subject to any disclaimer, the term of this patent is extended or adjusted under 35 U.S.C. 154(b) by 677 days.

(21) Appl. No.: 15/532,638

(22) PCT Filed: Dec. 1, 2015

(86) PCT No.: PCT/EP2015/078253
§ 371 (c)(1),
(2) Date: Jun. 2, 2017

(87) PCT Pub. No.: WO2016/087467
PCT Pub. Date: Jun. 9, 2016

(65) Prior Publication Data
US 2017/0360178 A1 Dec. 21, 2017

(30) Foreign Application Priority Data

Dec. 2, 2014 (FR) ..................................... 14 61771
Dec. 2, 2014 (FR) ..................................... 14 61780

(51) Int. Cl.
*A45D 40/26* (2006.01)
*B01F 5/06* (2006.01)
(Continued)

(52) U.S. Cl.
CPC ............. *A45D 40/26* (2013.01); *A45D 40/00* (2013.01); *A45D 44/005* (2013.01);
(Continued)

(58) Field of Classification Search
CPC ...... B01F 15/02; B05B 11/00446; B65D 1/06
(Continued)

(56) References Cited

U.S. PATENT DOCUMENTS 2,518,751 A * 8/1950 Carlton ................ B65D 77/245
222/106
2,628,743 A * 2/1953 Newlyn ................... A47K 5/12
222/173
(Continued)

FOREIGN PATENT DOCUMENTS

CN 1496755 A 5/2004
CN 103853067 A 6/2014
(Continued)

OTHER PUBLICATIONS

Nov. 13, 2019 Office Action issued in U.S. Appl. No. 15/532,708.
(Continued)

*Primary Examiner* — Timothy L Maust
(74) *Attorney, Agent, or Firm* — Oliff PLC

(57) ABSTRACT

A system for dispensing at least one makeup product, including a cup and a dispenser for filling the cup from the bottom with at least one product, the cup being secured to the dispenser at least while it is being filled with said product. The method for dispensing and evaluating makeup, including the steps of: allowing a video link to be established, for example over the Internet, from a camera at a first site to a second site, allowing the second site to operate either directly or indirectly a dispenser of such a dispensing system, present at the first site, this dispenser making it possible to vary the colour of mixture dispensed, and allowing a person present at the first site to apply the mixture dispensed and to send to the second site a corresponding image, so as to receive in return information relating to the result of the makeup.

26 Claims, 15 Drawing Sheets

Figure 7:
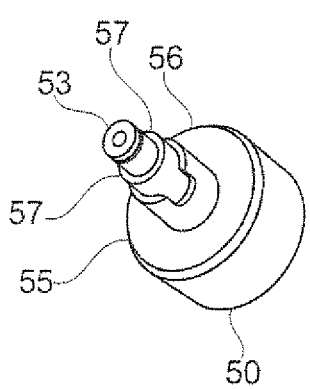

(51) Int. Cl.
*A45D 44/00* (2006.01)
*B01F 13/10* (2006.01)
*A45D 40/00* (2006.01)
*B01F 15/02* (2006.01)
*G01J 3/46* (2006.01)

(52) U.S. Cl.
CPC .......... *B01F 5/0641* (2013.01); *B01F 5/0647* (2013.01); *B01F 5/0698* (2013.01); *B01F 13/1063* (2013.01); *B01F 13/1066* (2013.01); *B01F 15/0237* (2013.01); *G01J 3/46* (2013.01)

(58) Field of Classification Search
USPC .......................................... 141/113, 144, 374
See application file for complete search history.

(56) References Cited

U.S. PATENT DOCUMENTS

| | | | | |
|---|---|---|---|---|
| 3,105,615 | A * | 10/1963 | Koga | B65D 35/22 222/94 |
| 3,203,454 | A * | 8/1965 | Micallef | B65D 83/28 141/113 |
| 4,294,293 | A * | 10/1981 | Lorenz | A45D 19/00 141/100 |
| 4,318,429 | A * | 3/1982 | Gouttebessis | B01D 19/0052 141/1 |
| 4,473,097 | A * | 9/1984 | Knickerbocker | G01F 19/00 141/113 |
| 4,712,593 | A * | 12/1987 | Zulauf | B67D 7/0227 141/113 |
| 4,723,712 | A | 2/1988 | Egli et al. | |
| 4,773,562 | A * | 9/1988 | Gueret | A45D 40/24 222/135 |
| 4,842,832 | A | 6/1989 | Inoue et al. | |
| 5,197,637 | A | 3/1993 | Naumann | |
| 5,622,692 | A | 4/1997 | Rigg et al. | |
| 5,645,884 | A | 7/1997 | Harlow, Jr. et al. | |
| 5,775,386 | A * | 7/1998 | Connan | B65B 3/16 141/103 |
| 5,785,960 | A | 7/1998 | Rigg et al. | |
| 5,903,465 | A | 5/1999 | Brown | |
| 6,029,842 | A * | 2/2000 | Sheffler | A45D 40/0068 220/288 |
| 6,464,107 | B1 | 10/2002 | Brugger | |
| 6,527,201 | B2 | 3/2003 | Lieber | |
| 7,445,372 | B1 | 11/2008 | Engel et al. | |
| 7,621,403 | B2 | 11/2009 | Althoff et al. | |
| 8,593,634 | B1 * | 11/2013 | Igarashi | B67D 7/08 356/402 |
| 9,007,588 | B1 | 4/2015 | Igarashi | |
| 9,064,279 | B1 | 6/2015 | Tuan et al. | |
| 10,342,316 | B2 | 7/2019 | Ajiki et al. | |
| 2002/0117516 | A1 | 8/2002 | Lasserre et al. | |
| 2002/0179639 | A1 * | 12/2002 | Bartholomew | A45D 44/00 222/144.5 |
| 2003/0069667 | A1 | 4/2003 | Dirksing et al. | |
| 2003/0127542 | A1 | 7/2003 | Cooper | |
| 2004/0078278 | A1 | 4/2004 | Dauga et al. | |
| 2004/0125996 | A1 | 7/2004 | Eddowes et al. | |
| 2004/0130967 | A1 | 7/2004 | Wolf et al. | |
| 2004/0218810 | A1 | 11/2004 | Momma | |
| 2005/0092772 | A1 | 5/2005 | Miller et al. | |
| 2006/0151531 | A1 | 7/2006 | Tikusis | |
| 2007/0186946 | A1 * | 8/2007 | Castleberry | A45D 40/24 132/200 |
| 2009/0097899 | A1 | 4/2009 | Carroll | |
| 2009/0213392 | A1 | 8/2009 | Hoshii et al. | |
| 2009/0231356 | A1 | 9/2009 | Barnes et al. | |
| 2009/0245603 | A1 | 10/2009 | Koruga et al. | |
| 2010/0170964 | A1 | 7/2010 | Fedorov | |
| 2010/0185322 | A1 | 7/2010 | Bylsma et al. | |
| 2010/0185966 | A1 | 7/2010 | Jette et al. | |
| 2011/0164263 | A1 | 7/2011 | Samain et al. | |
| 2011/0226803 | A1 | 9/2011 | Schwartz | |
| 2011/0315574 | A1 | 12/2011 | Lee | |
| 2012/0031925 | A1 | 2/2012 | Greenberg | |
| 2012/0279990 | A1 | 11/2012 | Werner et al. | |
| 2013/0181012 | A1 | 7/2013 | Nehren et al. | |
| 2014/0088507 | A1 | 3/2014 | Matthew | |
| 2016/0015152 | A1 | 1/2016 | Ajiki et al. | |
| 2016/0096716 | A1 * | 4/2016 | Al-Hakim | B67D 1/0894 141/113 |
| 2017/0256084 | A1 | 9/2017 | Iglehart et al. | |
| 2017/0360178 | A1 * | 12/2017 | Samain | B01F 13/1063 |

FOREIGN PATENT DOCUMENTS

| | | | |
|---|---|---|---|
| DE | 3744438 A1 | 7/1989 | |
| DE | 4110299 C1 | 2/1993 | |
| DE | 202011100742 U1 | 8/2012 | |
| EP | 0443741 A1 | 8/1991 | |
| EP | 1201318 A1 | 5/2002 | |
| EP | 1410840 A2 | 4/2004 | |
| EP | 1669139 A1 | 6/2006 | |
| EP | 2708290 A2 | 3/2014 | |
| EP | 2743003 A1 | 6/2014 | |
| FR | 2631254 A1 | 11/1989 | |
| FR | 2818101 B1 | 9/2003 | |
| FR | 2877819 A1 | 5/2006 | |
| FR | 2970403 A1 | 7/2012 | |
| FR | 3003752 A1 | 10/2014 | |
| GB | 2246550 A * | 2/1992 | B65B 1/06 |
| JP | S59-154490 A | 9/1984 | |
| JP | 2002-186519 A | 7/2002 | |
| JP | 3895542 B2 | 3/2007 | |
| JP | 2009-177789 A | 8/2009 | |
| JP | 2012-125664 A | 7/2012 | |
| KR | 2014-0023539 A | 2/2014 | |
| KR | 101435633 B1 | 8/2014 | |
| WO | 01/75586 A1 | 10/2001 | |
| WO | 02/05968 A2 | 1/2002 | |
| WO | 2006/127014 A1 | 11/2006 | |
| WO | 2010/082966 A1 | 7/2010 | |
| WO | 2011/025831 A1 | 3/2011 | |
| WO | 2013/072445 A1 | 5/2013 | |
| WO | 2013/078131 A1 | 5/2013 | |
| WO | 2016/08601 A1 | 1/2016 | |

OTHER PUBLICATIONS

May 18, 2018 Office Action issued in Korean Patent Application No. 10-2017-7018066.
Jul. 23, 2018 Office Action issued in European Patent Application No. 15 804 414.9.
Aug. 13, 2018 Office Action issued in Japanese Patent Application No. 2017-529384.
Jekyll & Hyde; "The Transformation Station"; (XP055493553); https://web.archive.org/web/20141111124209/http://jekyllandhyde.biz/index.php?route=product/product&path=59_70&product_id=51; retrieved Jul. 18, 2018.
Oct. 25, 2019 U.S. Office Action issued U.S. Appl. No. 15/532,665.
Aug. 23, 2019 Office Action issued in Japanese Patent Application No. 2017-529375.
May 7, 2019 Office Action issued in Japanese Patent Application No. 2017-529385.
Jun. 13, 2019 Office Action Issued for U.S. Appl. No. 15/532,658.
Jul. 2, 2018 Office Action issued in Japanese Patent Application No. 2017-529375.
Mar. 18, 2019 Office Action issued in Japanese Patent Application No. 2017-529375.
Jun. 26, 2019 Office Action issued in U.S. Appl. No. 15/532,708.
Apr. 14, 2016 International Search Report issued in International Application No. PCT/EP2015/078253.
Jun. 6, 2017 International Preliminary Report on Patentability in International Application No. PCT/EP2015/078253.
Jul. 13, 2016 International Search Report issued in International Application No. PCT/EP2015/078257.
Jun. 6, 2017 International Preliminary Report on Patentability issued in International Application No. PCT/EP2015/078257.

(56) References Cited

OTHER PUBLICATIONS

Verry, P. "Amazing Airbrush Changes Colors by Turning a Dial! the Transformation Station!", https://www.youtube.com/watch?v=_iuvMWhhu3l.
Mar. 3, 2016 International Search Report issued in International Application No. PCT/EP2015/078259.
Jun. 6, 2017 International Preliminary Report on Patentability issued in International Application No. PCT/EP2015/078259.
Feb. 25, 2016 International Search Report issued in International Application No. PCT/EP2015/078254.
Jun. 6, 2017 International Preliminary Report on Patentability issued in International Application No. PCT/EP2015/078254.
Jun. 6, 2017 International Preliminary Report on Patentability issued in International Application No. PCT/EP2015/078256.
Mar. 2, 2016 International Search Report issued in International Application No. PCT/EP2015/078256.
U.S. Appl. No. 15/532,722, filed Jun. 2, 2017 in the name of Franck Giron et al.
U.S. Appl. No. 15/532,665, filed Jun. 2, 2017 in the name of Henri Samain et al.
U.S. Appl. No. 15/532,708, filed Jun. 2, 2017 in the name of Henri Samain et al.
U.S. Appl. No. 15/532,658, filed Jun. 2, 2017 in the name of Henri Samain et al.
Aug. 6, 2019 Office Action issued in U.S. Appl. No. 15/532,722.
Dec. 6, 2019 Office Action issued in U.S. Appl. No. 15/532,658.
Apr. 12, 2019 Office Action issued in U.S. Appl. No. 15/532,722.
Jan. 2, 2020 Office Action issued in Chinese Patent Application No. 201580065470.9.
Jan. 13, 2020 Office Action issued in Chinese Patent Application No. 201580065546.8.

\* cited by examiner

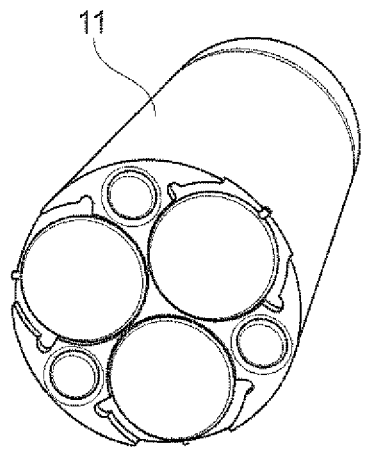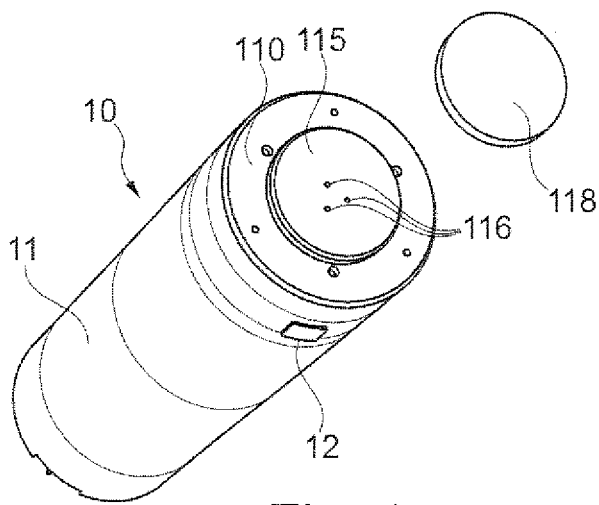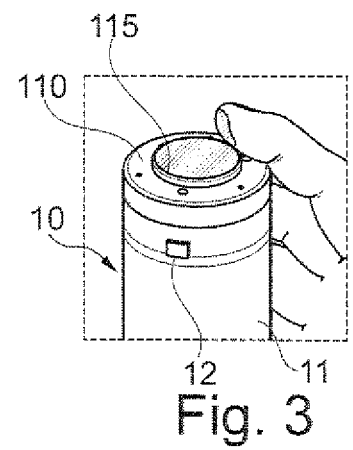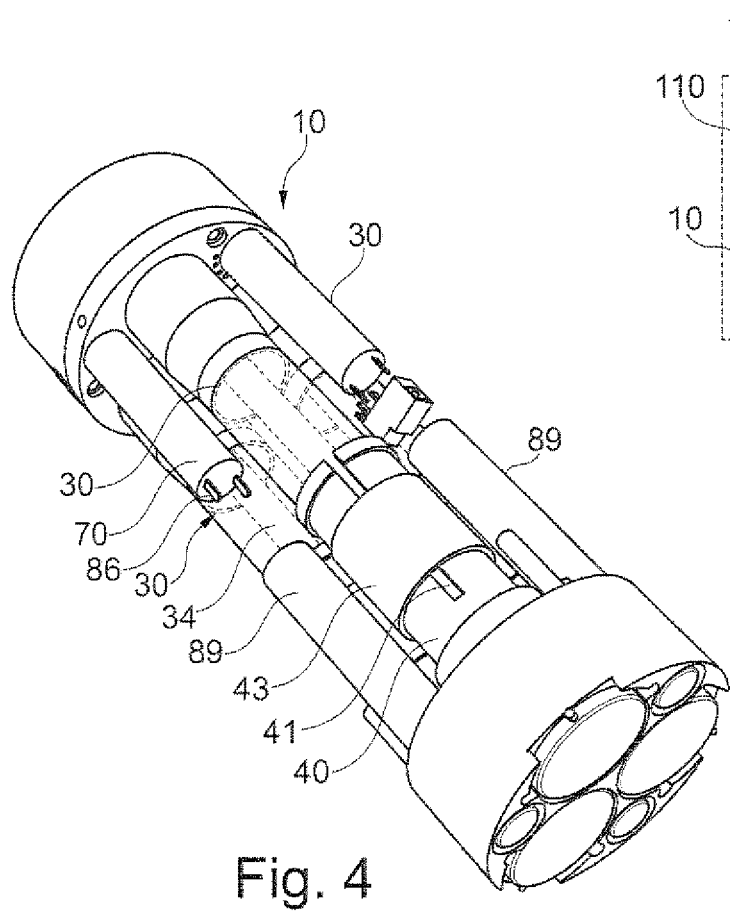

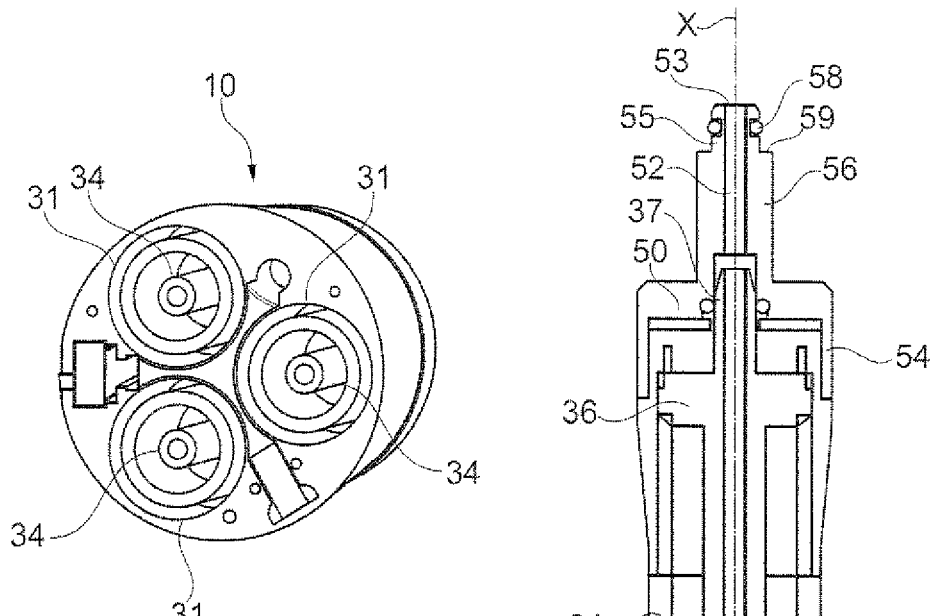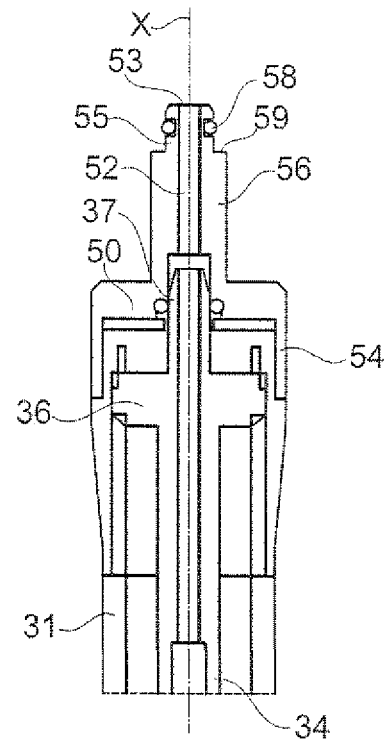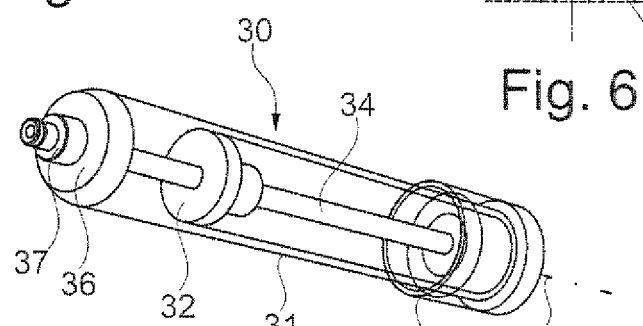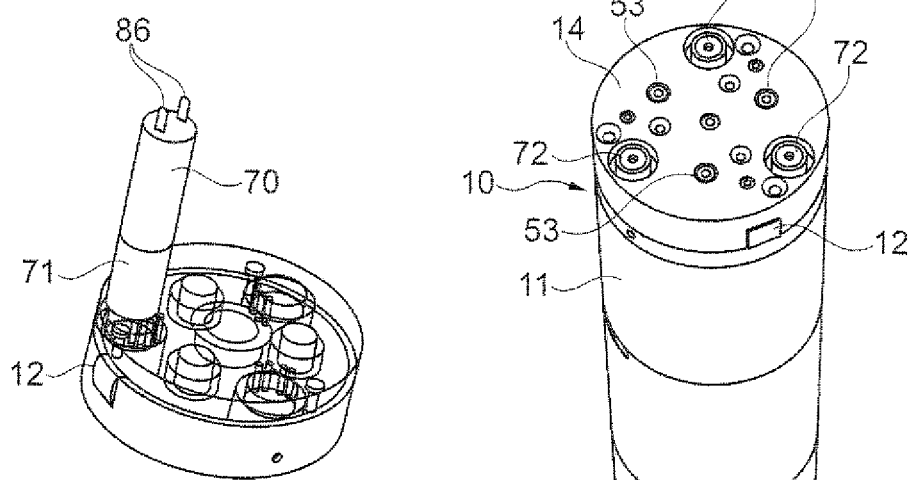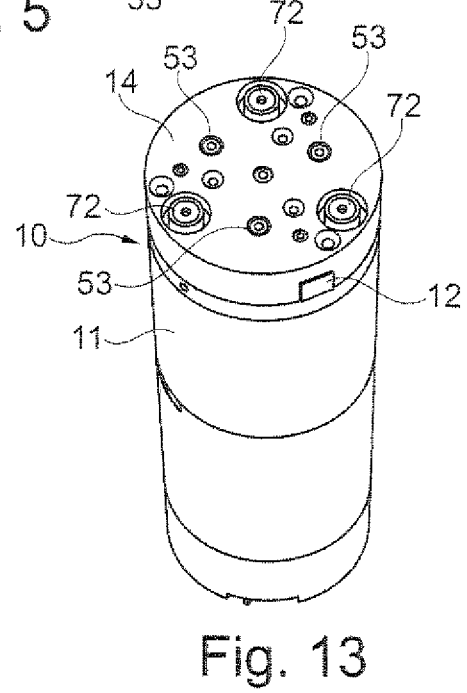

| No Zone | Name | A | B | C | Q | Date | Time of year | Age | Event |
|---|---|---|---|---|---|---|---|---|---|
| Z1 | Forehead | | | | | | | | |
| Z2 | Nose | | | | | | | | |
| Z3 | Cheeks | | | | | | | | |
| Z4 | Eyelids | | | | | | | | |
| Z5 | Chin | | | | | | | | |

SYSTEM FOR DISPENSING AT LEAST ONE MAKEUP PRODUCT AND METHOD FOR DISPENSING AND EVALUATING MAKEUP

The present invention relates to methods and systems for dispensing, notably a makeup product.

Many people wish to make themselves up in order to enhance their appearance, particularly their face.

There are two types of reason why these people may wish to do this:
- to conceal certain imperfections, such as blemishes, wrinkles or pores,
- to enhance the look of the face by changes of colour.

In both cases, the operation involves supplying a coloured substance and covering the skin or a zone of skin therewith.

In order to obtain an attractive effect, the person needs to make the correct choice of coloured substance.

In the first of the cases given above, the operation may be complicated because the face comprises a whole range of colours.

Thus, if the person wishes to cover only a few zones of the face, by attempting to make the colour added coincide with the natural colour of the surrounding skin, he or she needs to find the colour suited to each zone of the face, a task rendered all the more difficult by the fact that the coverage of the product and the thickness of the layer applied, together with the colour and surface condition of the underlying skin or the greasiness thereof may influence the result.

Bearing these difficulties in mind, people seeking to conceal imperfections in their face adopt the habit of covering the entire face. This then gets around the problem of choosing the coloured substance according to the zone of the face. However, because of the uniformity it brings, the result detracts from the natural appearance of the face.

In the second case, the operation is not simple either because it is difficult to find a coloured substance which best suits the appearance of the face. In particular, it is difficult to find the colour of ones colouring, particularly if looking for a bold colour different from ones natural colouring. Some people would like to choose sun-kissed colours or other shades of different colouring but do not do so out of fear that the colour will not suit them. And if they do, they often give up, disappointed. When not disappointed by the result, they no longer dare change colour.

The same goes for makeup applied to the lips, cheeks and eyelids.

There are very few solutions for solving these problems.

A first approach is to purchase numerous products and try them all out. This approach is costly and often gives rise to waste in so far as only a small number of the coloured substances tried are generally retained.

A second approach is to test out various products in store. That is not always suitable because it is very difficult to get a feeling for the results in just a few moments and somewhere missing the usual landmarks. In particular, in order to fully assess in store the effect of the makeup it would be necessary to be able to have the same lighting as will be achieved in future conditions of use, and this is something that is rarely possible. In general, it is only by testing out makeup over the course of a day that one can determine whether or not it is suitable. In addition, while certain stores have advisors and allow testing, a large number of other sales outlets and Internet sales do not allow this.

Another approach has been tested but not developed. This is to create ones products by hand by mixing several coloured products. This may prove relatively difficult to do because it is not very easy to reproduce the same mixture exactly a number of times over, and it is awkward to create quickly the mixtures one needs at the moment of applying the makeup.

Dispensers able to dispense a cosmetic composition of variable colour are also known.

Application US2003069667 relates to methods and devices that allow the cosmetic products used by a consumer to be customized. The consumer supplies selection criteria and from this a cosmetic product founula is derived. The base ingredients are blended in accordance with the formula and a customized cosmetic product is dispensed onto an intermediate surface for later application.

U.S. Pat. No. 5,785,960 discloses a method for obtaining foundations which are able to cover imperfections of the human skin. The steps of the method include using spectophotometry to measure a normal client skin in order to obtain values for the brightness, red and yellow in the skin colour, these being respectively denoted as the L, a and b values. These values are then converted by calculation into modified values determined by an L, a and b correction program. A foundation is formulated on the basis of these modified values. A remote-formulation machine converts the instructions received and meters out and blends a series of base products. The mixture delivered by the machine is packaged and sent to the client.

Application FR2970403 discloses a device for dispensing a cosmetic product, notably a scent, comprising at least one reservoir containing a product that is to be dispensed, notably several reservoirs, and a rinsing device. The device may be operated using a microcomputer or the like. A man-machine interface, for example a keyboard or a screen, notably a touch screen, allows the user to command the dispensing of a formula of his or her choice. The device may be set up to communicate with a server or other similar devices to exchange recipes or allow the user to receive advice. A memory of an electronic circuit of the device may record the best formulae so that these can be reproduced on demand and exchanged. The device may also be used to produce mixtures of coloured cosmetic products. A certain quantity, for example one drop, of coloured composition is then produced by the device and used for applying makeup or is to be blended with a foundation cream or any other coloured or uncoloured base. The device allows easy generation of the colour desired by the user, who may, for example, in just a few moments create several different colour mixtures.

Patent application FR2818101 relates to a device for spraying a cosmetic product, notably a foundation. It is possible to create an extemporaneous mixture on the substrate treated.

Application FR 2877819 describes a dispenser that allows the relative proportions of various base products dispensed to be varied. It is thus possible to adjust the colour. The base products come from different reservoirs and are dispensed via separate ducts which open side by side at one end of the dispenser. One disadvantage of this is that the user has to do the mixing on the skin or on an intermediate support. In addition, if the quantity dispensed is excessive, it is lost.

U.S. Pat. Nos. 5,622,692 and 5,903,465 describe other examples of dispensers allowing a customized cosmetic composition to be dispensed.

Of the tests that have been able to be attempted for automating the manufacture of a customized cosmetic composition, many are those in which the proposed solutions allow mixtures to be created in quantities of around 100 g or sometimes less, but not in the very small proportions generally needed by a person applying makeup, namely of the order of one gram or much less. In order to illustrate the order of this problem, let us consider the case of somebody wishing to hide two imperfections of the order of one cm² on his or her face. For the first zone, she needs to find the corresponding mixture, then deliver a very small quantity, for example around 10 mg, of it. For the second, she needs to change the setting of the dispenser, then, once again, deliver a very small quantity.

Therefore, for a great many people, choosing the coloured substances that will yield the best results remains a difficult matter.

There is therefore a need to make searching for a makeup product that meets the expectations of a consumer and that allows this consumer to create mixtures under reliable conditions and in very small quantities easier.

The invention thus, according to certain aspects thereof, seeks to make it easier to make up the face, and notably to find the products best suited to the various zones of the face.

There is still a need to improve the dispensing systems that allow variable coloured products to be delivered, in order notably to make these easier to use and improve the quality of the makeup.

Certain aspects of the invention rely upon a dispensing system that allows mixtures to be generated from base products. These base products may be of different colours, so that the colour of the mixture can be varied. The base products may even make it possible to vary the coverage of the mixture so that the colour resulting from applying the mixture to human keratinous substances varies, by being fairly close to that of said substances. Thus, the idea of colour is to be understood in a broad sense and encompasses mixtures the colour of which varies after application as a result of variations in their level of coverage and of the colour of the underlying skin.

The invention allows one or more zones of the face to be treated. Hereinafter, "zone" is the term used to denote a defined part of the face, fairly small in surface area, covering between 1 cm² and 100 cm², and better, ranging from 2 cm² to 50 cm².

Dispensing System

The dispensing system may consist of a single device operating autonomously, preferably that can be manipulated in one hand, or of a device that operates in interaction with other components or devices. It may for example entail various outlet interfaces which are mounted on the dispenser according to the type of makeup to be created, as will be specified later on. It may also entail a computer system which exchanges information with the dispenser in order to operate same, this computer system comprising, for example, a portable terminal such as a smartphone, a camera phone, a tablet, a laptop computer or a dedicated terminal.

For preference, the dispenser is designed to pressurize one or several compartments containing the base product or products, via volumetric metering devices, preferably a motor causing a piston to move in the corresponding compartment.

The dispenser may be formed of a housing and of at least two or three compartments, and preferably that same number of motors. For example, the rotation of the motors drives endless screws which push the pistons of each compartment. The advancing movement of the pistons is, for example, controlled by the number of command pulses sent to the motors and/or by the length of time these are operating. The motors may be powered in sequence or, for preference, simultaneously.

For example, the motors are powered during an elementary operating cycle for a short duration one after the other or at the same time as one another, so as to dispense corresponding microdoses.

The elementary cycles are repeated, possibly with a pause between them, giving the base products time to flow out of the compartments.

The compartments may be defined by cartridges which are removed when they become empty. As an alternative, the compartments are permanently present and refilled once they become empty.

Each cartridge may be closed by a stopper that can be removed to allow the cartridge to be cleaned.

For preference, the housing of the dispenser is of elongate shape along a longitudinal axis, making it easier to handle, and the cartridges are arranged inside the housing about this axis.

For preference, the cartridges are inserted from the rear and the mixture is delivered from the front. The cartridges may be inserted individually or, as an alternative, the cartridges constitute a one-piece assembly as they are inserted.

The cartridges may each comprise a volumetric metering mechanism comprising a piston moved by a drive mechanism of the dispenser in a direction accompanied by a reduction in the interior volume containing the base product and the expulsion of some product. It may be advantageous for the cartridges to have at least a region of their wall transparent so that the colour of the product contained therein can be seen.

The drive mechanism may comprise a motorization system formed of motors coupled to gearboxes, of elongate shape parallel to the longitudinal axis of the dispenser, and positioned between the cartridges. Positioning the motors and cartridges in this way makes the dispenser particularly compact.

The base product can leave the corresponding cartridge in a sealed manner then flow along a passage provided for this purpose in the housing of the dispenser, before leaving the latter.

The cartridges advantageously end in an end piece produced in such a way that once the cartridge has been inserted into the housing of the dispenser, the end of the end piece opens flush with the housing. As an alternative, the end piece is long enough to protrude beyond the housing and thus connect various outlet interfaces that can be attached to the housing of the dispenser.

By virtue of the drive mechanism comprising motors for causing the pistons to advance, it is possible with precision to deliver mixtures in very small quantities. Thus, the base products can be delivered at flow rates of as little as 10 µl/s, and preferably at flow rates ranging from 20 to 100 µl/s. A mixture of around 10 mg can therefore be produced easily. Such a dispensing system is therefore ideal for achieving small touches of makeup, for example to cover a small zone measuring 1 cm² or less.

It is also possible to create larger quantities of mixture such as the quantities needed to make up a cheek or a face. These quantities still remain relatively small, for example from 100 to 500 mg.

Thus, one subject of the invention, according to one aspect thereof, is a dispensing system comprising a dispenser having a housing, and at least one cartridge housed in the housing of the dispenser, this cartridge comprising a body and a piston capable of moving in the body, the housing comprising a motorized drive mechanism for moving the piston of the cartridge.

For preference, the cartridge comprises a dispensing end piece via which the product exits and this dispensing end piece is rotationally driven by the drive mechanism for moving the piston. The end piece may comprise at least one rotation-proofing relief, or better, two diametrically opposed rotation-proofing studs.

The end piece may bear a seal, notably an O-ring seal. Thus, when changing the cartridge the seal is also changed, making it possible to get around the problem of seal wear.

The dispenser may comprise an electronic board for controlling the motorized drive mechanism, this electronic board having the end piece or end pieces passing through it. That may make it possible to produce a board extending across substantially the entire cross section of the dispenser so that all the electronic components of the dispenser can be grouped together on a single board, thus improving compactness and reliability. The board may extend substantially perpendicular to the longitudinal axis of the housing. The board may bear a switch for controlling operation of the dispenser.

The dispensing system may be designed to operate in at least two dispensing modes.

In a first mode, referred to as "continuous", the mixture is dispensed as long as pressure is applied to the control switch.

In a second mode, referred to as "dose", a predefined quantity of the mixture is dispensed for each press of the switch.

The end piece or end pieces may open at one end of the housing. This may make it possible to reduce the dead volume, as will be detailed later on.

The end piece or end pieces may at their end have a shutoff system to prevent the products from drying out in the duct, for example a self-healing membrane.

The cartridge may comprise a hollow screw onto which the piston is screwed, the piston being able to move axially along the screw as the screw turns; the piston is prevented from turning in the body of the cartridge. For example, the friction of the piston against the body of the cartridge may be enough to prevent it from turning when the screw turns. For preference, rotation is rendered impossible with a cartridge body of non-circular cross section and a piston that is not deformable.

The torque of the motors may be determined electronically according to the current drawn, and used for example to detect that the piston has reached the end of its travel. Information regarding the torque may be transmitted remotely to a computer system that has a man-machine interface, so that correct operation of the dispenser can be monitored.

In order to adjust the shade, the dispensing system according to the invention must allow the user to vary the volume delivered from each compartment.

For preference, the dispenser is operated by a computer system built into the dispenser or external thereto, the dispenser then being able to exchange information with the computer system using a wireless or wired protocol.

The dispenser may thus be operated so as to allow the shade to be adjusted by controlled simultaneous or sequential dispensing of several base products of different colours.

The dispensing of the base products may be continuous; in such a case, the volumes of each of the base products are dispensed in a single shot, simultaneously or in succession.

In the case of simultaneous dispensing, it is beneficial to be able to adjust the respective flow rates of the various base products in order for the dispensed mixture to correspond at all times to the mixture desired. Such a dispensing mode may be suitable in particular when dispensing the mixture by spraying, using an airbrush. To adjust the flow rates it is possible, for example, to alter the speed at which the pistons move, for example in the case where the pistons are driven by an endless screw, by varying the rotational speed of the motors that drive the screw. The products may also be dispensed in a pulse manner with a dispensing time and a pause in each cycle. By altering the duty cycle it is possible to alter the flow rate.

All the products may be delivered simultaneously during the dispensing time or, as an alternative, the cycles of the various products are phase-shifted from one another so that one product is being dispensed while the other products are paused.

In one particular embodiment, the mixture is delivered into a cavity of a container which may close hermetically or not, for example in the form of a cup, into which an applicator, particularly a stylus or a brush may be slipped. Such a dispensing system is especially suited to liners, glosses and other formulae applied without direct contact with the hands. This container may be removable. For example, it is used as a lip-colour dispenser and has a dispensing system, for example using a screw. When not removable, the container may be produced with the body of the dispenser. When it is removable, it may constitute an output interface among others that can be mounted on the dispenser.

The compartments and, in particular, the cartridges, may contain all or part of the drive mechanism and, for example, the motorizing system or, better still, part of the motorizing system, the purpose of this being to reduce the number of moving parts in the body of the dispenser outside the cartridges. For example, the cartridges contain the rotor of the motor. Once the cartridges have been installed in the body of the dispenser, the rotors are made to interact with the stators.

The dispensing system is advantageously arranged in such a way as to allow the running of preprogrammed sequences in which the mixture delivered by the system is modified continuously or discontinuously. A "graduated" mode makes it possible for example to progress gradually from a mixture A to a mixture B. In the case where the application is by spraying, notably using an airbrush, that allows graduations to be achieved simply. An "alternate" mode makes it possible for example to switch quickly from a mixture A to a mixture B several times in succession. In the case of application by spraying, a multilayer application can thus be achieved, with different formulations for two superposed adjacent coats. Another mode makes it possible for example to offer several preprogrammed successive mixtures, the computer system each time indicating to the user how these should be used, for example by display on a screen.

In the case of manual application, the mixtures are dispensed for example into a cup. The person applies the makeup to the recommended place with a corresponding mixture taken from the cup then where appropriate cleans out the cup and commands delivery of a new mixture; the operation is repeated as many times as necessary until the person is fully made up.

The mixtures dispensed can be homogenized in various ways depending on the type of use. In the case of manual application, it can be done directly on the application zone at the time of application or in the cup before the mixture is picked up; in the case of an airbrush application, the pipe of the airbrush is used as an mixing chamber; if the mixture is dispensed into a container for later use, homogenization can be performed by hand or by passing the dispensed products through a mixing chamber situated between the dispenser and the container or incorporated directly into the container, as detailed hereinafter.

The product may be delivered by the dispensing system and used extemporaneously. As an alternative, the product delivered by the dispensing system is packaged and used later, for example on several occasions, with, for example, at least one day's interval between two uses.

Use for Making Up One or More Precise Zones of the Skin

The dispensing system allows makeup to be applied, day after day, treating only the zones that need to be hidden. In order to do this, small doses of makeup are delivered which are applied specifically and sequentially to the corresponding zones. Each small dose is produced using the mixture suited to the zone.

In one preferred embodiment of the invention, the dispensing system waits for information regarding which zone is to be treated and then delivers the corresponding mixture. It may use a preprogrammed look-up table for that purpose, this table being the result for example of a learning process as defined later on. As an alternative, the dispensing system informs the person, when delivering a mixture, of the zone to which the person is to apply the mixture. Thus, the dispensing system may follow an application program in which it delivers, in a given order, the various mixtures that are to be applied.

In one particular embodiment of the invention, the dispensing system is informed as to the quantities to be delivered. For that, it memorizes the relationship between the colour, the zone of the face and the quantity needed, thereby making it possible to reduce costs and wastage of product, and to cover the skin only lightly, thus avoiding occlusion effects. In so doing, it is possible to use products with a high covering capability and that provide too much cover to be applied to the whole of the face. Thus it is possible to obtain makeup of natural or even undetectable appearance.

The dispensing system may also make it possible, by facilitating the dispensing of small quantities and rapid use thereof, to reduce the time for which the products are kept, thus making it possible to reduce the risks of the products changing and/or to reduce the amounts of preservative to be used.

The dispensing system is suited to treating the zones that are to be concealed, without having to conceal the entire face.

When the user is looking for the colour to apply to a zone of the face, it is advantageous to memorize the colour best suited to each zone, and the dispensing system is thus advantageously designed to memorize this colour and the corresponding zone. Thus, by using the memorized information, on each use, the same mixture can be delivered for each zone or, if several zones are being treated, the same series of mixtures can be delivered for the same series of zones.

The dispensing system may also be designed to allow a zone to be treated by varying the colours application after application. Thus, the person may make up her lips using different colours, that she chooses on a day by day basis to suit her taste. This approach is also suitable for the eyelids or eyelashes, and for face makeup because the person may fancy a change of foundation colour. For example, on weekdays, the person applies a pale coloured foundation, with a more tanned foundation colour at the weekends, or may have eye makeup in one colour one day and another colour another day.

The dispensing system may be designed to allow the user to change colour to suit her tastes according to the day, the time, what she is wearing, and the weather. Thus, a system to assist with decision making is advantageously provided to guide the user in her choices of colour.

An assistance system may also be provided for balancing the colours on the same face and contribute towards a successful overall makeup look.

It may be desirable for several people in the same group, for example a family, to be able to use the dispensing system, thus reducing costs and minimizing the space taken up. This solution is particularly suited to travel or hotels, campsites, aeroplanes, camper vans, boutiques, schools, etc. For that, provision may be made for the dispensing system to be able to be informed as to which person is using it, so as to access pre-stored personal data.

Continuous Use for Graduated Makeup

In this application, the dispensing system changes the formulation of the mixture while it is delivering the product. In addition, the outlet for the base products or for the mixture is moved relative to a container or a support defining an application surface. In one particular embodiment of the invention, the dispensing system is designed to calculate the way in which the mixture evolves as a function of the colour C1 of one zone to be treated and of the colour C2 of another zone to be treated. For example, with the knowledge that the chin requires a colour C1 and that the cheek requires a colour C2, the dispensing system may vary the formulation of the mixture while it is delivering in order to graduate the colour between these two colours. This for example makes it possible to better conceal imperfections of the face while ensuring that the end result is realistic, or allows colour to be graduated for beautifying purposes. The dispensing system may also be designed so that the user can command a variation in colour of the mixture dispensed without the start and/or end colours having been set beforehand. To do that, the dispensing system may possess a location or auto location system and from a look-up table deduce the colours C1 and C2 that it is to create and therefore the evolutions of the mixture that it is to achieve.

The dispensing system may comprise an outlet head, particularly in the case of an airbrush, which is mobile and steered. This option then makes it possible to achieve graduated effects without moving the rest of the dispensing system. For example, the dispensing system is located near to the cheek, then a control system is triggered that will automatically steer the variation in formulation of the mixture and the movement of the outlet head so as, for example, to make the centre of the cheek redder than the periphery thereof, with a graduation between the two.

The dispensing system may even be used to create tailor-made products that are kept for several applications.

It is also possible to produce solid or semi-solid products.

Manufacture of "Bespoke" Compacts or Other Solid or Semi-Solid Products

The dispensing system may be designed to allow a mixture to be chosen and delivered to a container such as a cup. The mixture preferably comprises compounds which are such that the mixture can set solid.

More preferably, use is made of compounds that make the setting especially rapid. These compounds are either deposited in the container before or after it is filled with the other ingredients, or provided in the compartments of the dispenser with the other ingredients of the base products or contained in the dispenser in a compartment specially designed to contain them.

Specific compositions which may, by chemical, biochemical or physicochemical reaction harden quickly after discharge may thus be dispensed. These compositions are specially designed for the creation of compacts, namely they:

set solid,
yield a material that can crumble if rubbed, and
are preferably coloured.

For preference, these compositions are very rich in solid particles, containing for example more than 30 wt % of solid particles in relation to the total weight of the composition.

These compositions may contain absorbent particles or reactive compounds, such as those that react in contact with the air, for example cyanoacrylate or alphasilanes or those which react to light, notably UV.

The container into which the mixture is dispensed may contain a compound A and the dispensed compositions may contain a compound B, A and B being chosen to react with one another and solidify the mixture.

In one particular embodiment of the invention, the dispensing system incorporates a heating means, for example with an electrical resistor, to create lipsticks or other waxy products. In that case, the base products are heated before being delivered.

The dispensing system may also comprise a means for supplying heat and/or light energy, after the mixture has been dispensed into a container, for example an electric resistance or an LED, notably UV. This energy may accelerate the setting-solid of the dispensed mixture.

For preference, the mixture is homogenized before it sets solid.

Creation of Colour Palettes

The dispensing system may comprise a support, having several regions, and may be designed to automatically generate several mixtures set out in the said regions, for example a series of colours suited to various parts of the face.

The support may define several cavities to accept the mixtures or may bear several containers, for example in the form of cups, potentially cups that can be detached from the support.

In one particular case, the support adopts the shape of a face with regions to accept the mixtures for targeted application zones.

The support may be able to move, notably to rotate, with respect to the body of the dispenser and, for example, may be driven in its movement by the dispenser so that the various spaces or containers can be filled in succession.

Cup-Type Dispenser

There is a benefit to having a dispensing system capable of delivering a mixture that the user can easily pick up. Moreover, in cases in which the base products delivered by the dispensing system are not already blended, there is a need to allow the user to perform the mixing easily.

In one of the aspects of the invention, independently of or in combination with the other aspects thereof, and notably with the foregoing, one subject of the invention is a system for dispensing at least one makeup product, comprising a cup and a dispenser for filling the cup with at least one product, the cup being secured to the dispenser at least while it is being filled.

The cup is sometimes also known as a "crucible" and that term is to be understood in its broadest sense.

A "cup secured to the dispenser" is to be understood to mean that the cup is held, notably immobilized, at least temporarily, on the dispenser, being for example fixed to the latter by screws, magnetic attraction, clip-fastening, bayonet locking, clamping or produced with a part of the dispenser body by material moulding. The cup when secured to the dispenser allows the latter to be manipulated in one hand, the cup remaining in place on the dispenser while the latter is being moved around.

The dispenser may be offered to the user with the cup already in place. As an alternative, the cup is installed by the user the first time the dispensing system is used.

The cup is preferably wider than it is deep, making access to it easier and allowing the product, notably the mixture, to be picked up with an applicator or a finger.

For preference, the cup can be detached from the dispenser and constitutes one outlet interface that can be chosen from a collection of outlet interfaces that can be mounted on the dispenser, at the choice of the user and according to the making up to be performed, as detailed later on.

For preference, the dispensing system comprises several filling orifices for filling with different base products, opening into the cup. Thus, the mixing of these products may take place in the cup.

The cup preferably has a bottom of outwardly concave shape, making it easier for the user to clean it between two uses.

In addition, that may make the product easier for the user to pick up and the base products easier to mix.

For preference, the dispenser allows at least two base products to be delivered to the cup, in adjustable proportions, and better still, at least three products.

In one exemplary embodiment, the dispensing system comprises at least two cups that can be selectively fed by the dispenser. That may allow the user to fill these two cups quickly with mixtures with different characteristics. That may facilitate the testing of coloured substances and/or allow the preparation of several different colour mixtures intended for making up respective zones of the face. The cups may be associated with identifiers reminding the user of the zone of the face for which a mixture contained in a given cup is intended.

The cups may be able to move relative to the dispenser, being for example borne by a mobile support such as a turret that can rotate with respect to the dispenser or by a slide capable of translational movement with respect to the dispenser.

The dispensing system may comprise a lid for closing the cup. This closure lid is preferably transparent so that the user can see the colour of the mixture contained inside.

When the cup is detachable from the dispenser it may if appropriate be slipped into a housing that allows it to be transported more easily, this housing potentially if appropriate containing a mirror and/or an applicator. The lid of the housing may in this case act as a lid for the cup.

The volume of the cup may be between 2 and 1000 mm$^3$.

The base product or products delivered to the cup are preferably foundations but as an alternative may be lip or eye makeup products.

The cup is preferably of a shape that exhibits symmetry of revolution. As an alternative, it has a polygonal or some other contour. Its largest inside diameter, or that of the inscribed circle in the case of a non-circular contour, is preferably between 2 and 100 mm, preferentially 5 to 40 mm. Its depth is preferably between 1 and 10 mm. For preference, the size and shape of the cup allow either direct application of the mixture to the skin or the mixture to be picked up on a finger or an applicator. The cup may be made of an elastically deformable material, making it possible for example to turn the concavity of the bottom of the cup inside out and empty it more easily or use it to apply the product.

The cup may have no blender; in that case, the base products may arrive in the cup from the dispenser in the unmixed state, via distinct respective dispensing orifices. As an alternative, the dispenser incorporates a blender and the base products arrive in the cup already blended.

The cup may also incorporate a static blender as detailed later on, which is fed via distinct filling orifices of the dispenser and which preferably delivers the mixture into a cavity of the cup situated above the blender.

A further subject of the invention is a method for preparing a makeup product, comprising the step of filling a cup of a dispensing system as defined above with at least one base product from the dispenser.

Several products may be delivered into the bottom of the cup then blended using a finger or an applicator or a static blender incorporated into the cup.

The cup is preferably filled from underneath.

Dispensing systems using a sonotrode have been proposed in the past.

The cup according to the invention is not intended to vibrate in order to dispense the product or products conveyed by the feed duct or ducts that supply it. It differs from a sonotrode. For preference, the cup is made of plastic.

Blender Incorporated Into the Outlet Interface

There is a benefit in having a dispensing system capable of delivering a mixture that can easily be used, notably picked up by the user, without the need for an additional mixing action on the part of the user.

In one of the aspects of the invention, independently of or in combination with the other aspects thereof, and notably with the foregoing, one subject of the invention is a dispensing system comprising a dispenser having base product outlet passages and an outlet interface detachable from the dispenser, this interface having a static blender preferably delivering the mixture to a cavity from which it can be picked up.

The static blender may be situated under the abovementioned cavity. The dispensing system is then particularly suited to the creation of compacts, using cups with an in-built static blender as outlet interfaces. In that case, the cavity of the cup is filled with product from underneath. After passing through the static blender, the blended base products cover the blender.

According to this aspect of the invention, it is possible to use several outlet interfaces and to fill them with different respective mixtures, without the need to purge the blender, thereby reducing losses of product. The outlet interface may if appropriate be a single-use interface.

For preference, the static blender comprises a central chamber communicating with base product intake passages. This central chamber may communicate with a peripheral chamber comprising a series of partitions which act as deflectors for the mixture and create shearing thereof.

The peripheral chamber may comprise a perforated annular partition defining perforations through which the mixture passes as it circulates in the peripheral chamber. The central and peripheral chambers may be closed at the top by a wall which defines the end wall of the cavity accepting the mixture.

The end wall of the peripheral chamber may be of helical shape about the axis of the cup and of a height that decreases in the direction towards the outlet. The latter may open ahead of a connecting ramp connecting the end wall of the peripheral chamber and the top wall of the blender, this connecting ramp preferably being a portion of a helix extending the helix formed by the end wall of the peripheral chamber.

For preference, the peripheral chamber comprises the aforementioned annular partition and radial partitions that force the mixture to circulate alternately between upper and lower regions of the peripheral chamber and between radially inner and outer regions, the mixture circulating for example from an upper and radially outer region to a lower and radially outer region by passing through the aforementioned annular partition.

The blender may comprise an outer body in which a component forming the heart of the blender is housed, the outer body radially closing the peripheral chamber on the outside and comprising an upright that separates the central and peripheral chambers.

The outer body of the mixer and the core of the mixer may each be produced as a single piece by injection moulding.

Reduced Dead Volume

There is benefit to be had in reducing the losses of product when changing the formulation of the mixture and in allowing the colour of the mixture to be varied as quickly as possible during application, particularly when the dispenser is coupled to an airbrush.

In one of the aspects of the invention, independently of or in combination with the other aspects thereof, and notably with the foregoing, one subject of the invention is a system for dispensing a makeup product comprising a dispenser that accepts at least two cartridges each one having a reservoir containing a base product, the latter leaving the cartridge via an outlet passage of the cartridge, this outlet passage opening to outside of the dispenser or near the external surface thereof.

The outlet passage may notably open into a zone in which the mixture is picked up or close to this zone, notably less than 5 mm away, better still less than 3 mm away, better still less than 1 mm away, or even better still flush therewith.

The cross section of the outlet passage is, for example, between 1 and 3 $mm^2$.

Thus, each base product coming from a cartridge can leave the dispenser without mixing with a base product from another cartridge and the dead volume that cannot be picked up and is liable to increase the inertia of the system is minimized. The product is more quickly available without having to circulate through special passages in the housing of the dispenser, thereby avoiding a painstaking purging step in the event of a cartridge change.

The outside of the dispenser may be the product pick up zone, notably when the dispenser is produced with a cup not designed to be removed, into which the mixture is dispensed, or a dispensing zone intended for the mounting of a removable outlet interface which defines the pickup zone. This outlet interface may comprise a cup as defined hereinabove. This mounting zone corresponds for example to the outside of the housing of the dispenser in the absence of an outlet interface. The mounting zone may be substantially planar and perpendicular to the longitudinal axis of the dispenser housing.

The dispenser may comprise three cartridges of base product.

The dispenser may have housings to accept the cartridges, which are preferably received removably in the dispenser. The latter may comprise passages for ducts for the cartridges defining the outlet passages.

The length of these ducts is preferably such that the ducts are set back slightly from the end or lie flush with the cavity used for picking up the product or, as an alternative, are set back slightly from or flush with the end face of the housing of the dispenser that defines the mounting zone.

These ducts of the cartridges may be end pieces used for causing the pistons to move within the cartridges, as detailed above.

Multiple Outlet Interfaces

There is a need to be able, using the same dispensing system, to achieve different makeup looks easily and be able, if so desired, to make up zones as different as the skin, the lips, the eyelashes or eyebrows.

In one of the aspects of the invention, independently of or in combination with the other aspects thereof, and notably with the foregoing, one subject of the invention is a dispensing system comprising an assembly comprising a dispenser of at least one cosmetic, notably makeup, product and at least two outlet interfaces, each of which can be mounted removably on the dispenser, these outlet interfaces which are able to receive the product or products delivered by the dispenser preferably being chosen from among the following:

- an outlet interface comprising a container, notably a cup, allowing the product to be picked up using a finger or using an applicator,
- an outlet interface allowing the product to be delivered to a spray system, notably an airbrush,
- an outlet interface comprising several regions for receiving the product, which can move relative to the dispenser,
- an outlet interface that allows the product to be delivered to a dispensing end piece.

For preference, the assembly comprises at least three of said outlet interfaces, or better still, four outlet interfaces.

The dispenser may comprise at least two different base products and allow these to be delivered in variable proportions and, for preference, the dispenser comprises three different base products and allows these to be delivered in variable proportions.

Each outlet interface may comprise a base allowing it to be fixed to the dispenser. This fixing may be done using screws for example but for preference the base is designed to allow an outlet interface to be removed and replaced without the need for tools. It is, for example, a quarter-turn fixing or a fixing using an external locking ring.

The outlet interface and/or the housing of the dispenser may comprise seals allowing sealed communication between the housing of the dispenser and the outlet interface. Where appropriate, the dispenser is designed to recognize the outlet interface mounted above, for example by virtue of the outlet interface having identifiers in the form of specific reliefs which are detected by the dispenser, or in the form of an electronic chip that the dispenser recognizes. That may allow the operation of the dispenser to be adapted to suit the outlet interface mounted above. The dispenser may communicate information about the outlet interface it is bearing to a computer system and the computer system may, on the basis of this information, display a specific screen and/or run a specific program for controlling the operating parameters of the dispenser so as, for example, to adapt the dose dispensed and/or the flow rate to the type of outlet interface.

The user may be initially offered several outlet interfaces with a common dispenser within one and the same package, for example a case or a cardboard box.

A further subject of the invention is a makeup method involving the step of selecting an outlet interface, mounting it on the dispenser and delivering the product or products contained in the dispenser to the interface.

Mapping and Learning

The term "mapping" is to be understood here to mean a process of indexing a colour with a zone, with recording.

The mapping may relate to applications to zones smaller than 1 cm$^2$. However, the naked eye then has difficulty in discerning whether the result obtained is adequate, and it is preferable to substitute an instrumented evaluation with magnification for evaluation by the naked eye. Small quantities of coloured substance may be applied with the finger, using conventional tools such as brushes, or using specialist applicators.

The map may be generated during a learning period during which the user carries out tests with mixtures on different zones of the face; once filled in, the map can then be used for everyday makeup.

Specific graphic interfaces can be used during the learning period and during the period of use of the map.

In particular, the dispensing system may be used with a graphic interface in which the operator sees the face, which is for example a schematic, figurative or accurate representation such as a photograph or a 3D simulation. In that case, the operator can point at part of the face on the screen to show and/or deliver the appropriate colour. The graphic interface may also show the other zones of the face where use of that same colour is appropriate.

To create the map, the operator applies a colour, then assesses.

The zones of the face can be treated one after the other; for example, the exercise is performed on part of the cheek, then on the nose, etc.

Another option is to create a given mixture and apply this same mixture to several zones. The operator then needs to look for the zone of the face to which the colour is suited. The mixture is then indexed in the computer system which attributes it to the zone or zones of the face for which it is suitable.

In one of the aspects of the invention, independently of or in combination with the other aspects thereof, and notably with the foregoing, one subject of the invention is a learning process for a dispensing system comprising a dispenser allowing a variable mixture of colour to be dispensed, and a computer system allowing a colour to be selected and data to be stored, comprising the steps involving:

a) selecting at least one colour using an interface of the computer system,
b) using the dispenser to deliver at least one mixture of the selected colour,
c) evaluating the mixture or mixtures dispensed after they have been applied to at least one zone of the face,
d) memorizing the characteristics of at least one mixture, notably a mixture that the user wishes to be able to recall, and of at least one zone on which it has been tested.

This memorizing can be performed notably with a view to a subsequent dispensing of this mixture for making up the said zone.

For preference, the computer system is designed to allow the user to indicate whether or not the result of the test is satisfactory, or even to inform same of the comparison with a test carried out earlier.

It is also possible to create a given mixture and to look for the zone of the face for which it is suitable. The mixture is then recorded, attributing it to the zone or zones of the face for which it is suitable, in a look-up table that will be used subsequently in order to deduce, on the basis of a zone of the skin, which mixture to use.

The same procedure can be adopted with other mixtures in order to create a map of the entire face and thus have a complete look-up table for the face.

It is also possible to create a given mixture, apply it to a given zone then vary the mixture until the most suitable mixture is obtained. The mixture is then recorded, attributing it to the zone or zones of the face for which it is suitable, in a look-up table that will be used subsequently in order to deduce, on the basis of a zone of the skin, which mixture to use.

For preference, the computer system evaluates and memorizes the quantities used zone by zone.

Such a method, which uses "test patches" makes it possible to identify which product or products the person wishing to apply makeup requires. Thus, the dispensing system can be used at sales outlets to advise people wishing to apply makeup or at home in order to define correctly which products to order.

The interface of the computer system preferably comprises a touch screen displaying the colour of the mixture when it is selected.

The interface may display a face and allow the computer system to be informed by selecting the zone on the face displayed.

The computer system is preferably designed to allow a zone, mixture reconstruction parameters and the date of the test and/or any other identifier of the mixture to be associated with one another.

The computer system is preferably also designed to allow at least one of the following data: the name of the zone, the period of the year, the name of an event, a user identifier and the age of the user, to be associated in addition with the said zone, with the mixture reconstruction parameters and with the date or identifier of the mixture.

Steps a) to c) may be repeated at least once before the characteristics of the mixture are memorized in step d).

The computer system may be designed to search a database for the reference of a commercial product on the basis of the characteristics of the mixture identified as being suitable for at least one given zone, and to relay this information to the user.

The selection in step a) may be carried out using an expert system, which may or may not be external to the computer system.

The expert system may analyse an image of the user in order to propose a mixture colour at least on the basis of the image analysed.

Step a) may be preceded by the computer system proposing to the user a colour and a zone to be tested with a mixture of this colour.

The computer system may be designed to allow the user to inform same of their assessment of the result of the test in step c) and to generate a proposal to modify the mixture to be selected upon return to step a).

The computer system may be designed to propose at least one colour of mixture in step a) according to an application zone of which it has been informed by the user.

The computer system may be designed to propose at least one application zone in step a), on the basis of a colour of which it has been informed by the user.

The dispenser may, in step b), deliver at least two mixtures of different colours, preferably separate, so that they can be applied simultaneously to the test zone. That may allow time to be saved and make it easier to compare the results.

A further subject of the invention is a method of making up using a dispensing system according to this aspect of the invention, in which:

a) the user sends the computer system a request regarding a need for makeup, b) the computer system in return generates a proposed colour for making up an associated zone, on the basis of the learning performed beforehand, and c) the computer system operates the dispenser to produce the mixture of the proposed colour, notably if this is validated by the user.

Such a method may use a map previously established with the user.

A further subject of the invention is a computer program product containing code instructions which, when executed in a computer system, allow the computer system to be made to:

allow the user to select at least one colour and/or one application zone, notably using an interface such as a touch screen, operate a dispenser in such a way as to deliver a mixture of the colour selected by the user, allow the user to trigger the memorizing of the colour of the mixture and of an associated application zone, notably with a view to later dispensing the same mixture, notably on the same zone.

The computer program product may comprise code instructions which, when run in a computer system, allow the computer system to be made to:

receive a request from the user regarding a need for makeup, notably via an interface such as a touch screen, on the basis at least of data generated by the learning process as defined hereinabove, propose at least one colour and/or one application zone, operate a dispenser to produce the mixture of the proposed colour, notably if this is validated by the user.

Remote Assistance

It is desirable to be able to assist the user in applying makeup, notably in choosing the correct colourings.

In one of the aspects of the invention, independently of or in combination with the other aspects thereof, and notably with the foregoing, one subject of the invention is a method of applying makeup involving the steps consisting in:

allowing a video link to be established, for example over the Internet, between a camera on a first site and a second site, allowing the second site to operate either directly or indirectly a dispenser present on the first site, this dispenser making it possible to vary the colour of a mixture dispensed, allowing a person present at the first site to apply the mixture dispensed and to send to the second site a corresponding image so as to receive in return information relating to the result of the makeup.

The second site may notably comprise a viewing screen which allows an advisor sitting at this screen to see the result of the makeup with the product dispensed by the dispenser and advise the person who has applied the makeup. This advisor may in return influence the dispenser to alter the colour of the mixture and adapt it to best suit the face of the person present on the first site. Thus, this person controls the mixture delivered by the dispenser. The first person may make herself up under the gaze of the second. The second person sees the result of the test on their screen and can thus correct the mixture that this second person will control remotely until the ideal makeup is obtained.

If appropriate, the video acquisition can be calibrated using a test pattern or with the mixture dispensed by the dispenser onto a reference surface. That then allows a more faithful viewing of the makeup applied at the first site.

For preference, the video link between the two sites is a two-way link.

The first site may receive a tutorial from the second site, if appropriate.

Identifiers of the base products may be communicated to the second site; that may make it possible to determine precisely the colour of each of the base products.

The method may involve memorizing the dispenser setting parameters once a given mixture is considered to be satisfactory. For preference, this memory storage may be commanded from the second site. The memory storage may be in the computer system present on the first site and/or on an external server.

One alternative may be to have one person working to help several apply makeup. This embodiment makes it possible to develop makeup artists and their work, either within an institute or over the Internet. It also allows people with limited capabilities, such as people with poor eyesight, or people who have difficulty discerning colours, or the elderly, or those lacking in self confidence to apply makeup.

Operation Via Touch-Sensitive interface

It is necessary to make control of the dispensing system and notably the choice of the colour of the mixture dispensed easier.

In one of the aspects of the invention, independently of or in combination with the other aspects thereof, and notably with the foregoing, one subject of the invention is a dispensing system comprising a dispenser and a computer system for operating the dispenser, this computer system comprising a touch screen on which the colour of the mixture may be displayed and a selection means that can be moved over the screen in order to vary the colour of the mixture dispensed.

For preference, the screen displays end-point colours between which the colour of the mixture can be selected by moving the selection means between these end-point colours.

The screen may display a scale of colours between at least two colours, or a surface, notably of triangular outline, within which the selection means can be moved. This surface may locally show the colour of the mixture according for example to the distance from each of the vertices, each one embodying a pure base product.

The computer system may perform some of the calculations necessary to determine the fractions of each of the base products that lead to a mixture of the desired colour.

The computer system may be a smartphone, a camera phone, a tablet or a personal computer. As an alternative, it is incorporated into the housing of the dispenser.

The computer system may have a camera. The latter can be used notably for capturing an image of the user and/or of the mixture.

The computer system may be designed to display an image of a face to make it easier to identify the zones to which the mixture is to be applied.

Coupling of the Dispensing System to a Spray Means

The dispensing system may comprise or be connected to a means of spraying the mixture, preferably an airbrush.

Another of the aspects of the invention is to improve still further the dispensing systems that comprise a spray system, preferably an airbrush, and according to one of the aspects of the invention, independently of or in combination with the other aspects, and notably the foregoing, one subject of the invention is an assembly comprising:
- a spray means, preferably an airbrush comprising a pickup chamber subjected to a stream of entrainment air,
- a dispenser comprising at least two compartments containing different base products, the products being delivered to the spray means preferably by distinct distribution orifices.

The dispenser may comprise three cartridges containing makeup products of different colours.

The airbrush may comprise a stylus defining the pickup chamber, the stylus being fixed to the dispenser or to an outlet interface fixed to the dispenser or forming an integral part of this outlet interface.

The dispensing system may comprise a circuit controlling operation of the dispenser, allowing the proportion of base products delivered to the pickup chamber to be varied while the airbrush is in operation. The proportions may be modified according to the movement of the airbrush relative to the surface onto which the mixture is sprayed. This movement may if appropriate be mechanized.

This control circuit may comprise or be constituted by a computer system as defined above.

The casing of the dispenser may act as a hand grip when the assembly is being handled for delivering the mixture.

The dispenser may comprise a camera and/or one or more sensors such as accelerometers so as to automatically locate the zone to which the mixture is applied, and so as to be able to regulate the colour automatically according to the position, where appropriate.

A further subject of the invention is a method of applying makeup using an assembly as defined hereinabove, in which method a mixture is sprayed onto the skin using the spray means, notably the airbrush.

The composition of the mixture can be modified as the airbrush moves relative to the skin. A gradated effect can be achieved.

This aspect of the invention relies on the observation that the dispenser can be used to supply the spray system, notably the airbrush, while at the same time allowing the dispensing system to be responsive enough to allow a change in the colour of the mixture dispensed while the face is being made up, notably as the zone to be made up changes.

It may be advantageous for the dispensing of products to be performed iteratively, notably with dispensing times that are not phase-shifted between the various products.

That may make it easier to vary the composition of the mixture distributed over the course of time.

The mixture may be created directly in the airbrush, with practically no troublesome dead volume, thus allowing the mixture sprayed to be changed in real time. The depression created in the pickup chamber is strong enough to entrain the base products without in any way impeding the metering.

The depression in the pickup chamber is, for example, between 10 mbar and 200 mbar.

The viscosity of the base products as measured at 1 atm and 25° C. with a CONTRAVES TV rotary viscometer fitted with an MS-r3 or MS-r4 measuring bar at a frequency of 60 Hz after 10 minutes of rotation of the measuring bar is, for example, between 0.05 Pa·s and 50 Pa·s.

The cross section of the passages along which the base products arrive in the chamber is, for example, between 1 and 3 $mm^2$.

The product is preferably supplied continuously.

It is also possible to apply immiscible or reactive base products, such as an aqueous gel and an oily gel, simultaneously, and these will be deposited in pixelated fashion directly onto the skin, producing a kind of gel/gel in situ, reactive silicones or colorants that react with one another. The ratios of base products can be adjusted according to the particular result desired. For example, in the case of aqueous gels and oily gels, the ratio can be varied from 10/1 to 1/10.

Location or Auto Location System

The dispensing system according to the invention may have a location or auto location system.

A location system is the name given to a means via which the person inputs the zone that she is to treat. This can be performed notably using systems that leave at least one hand free. Thus, an interface of a computer system such as a touch screen, a joystick, or voice recognition system can be used.

An auto location system is the name given to a means for inputting the zone that is to be treated without intervention on the part of the person. This can be achieved using one or more accelerometers which, from the movements deduce the directions targeted by the person or by a camera and an image recognition system.

Figure 8:
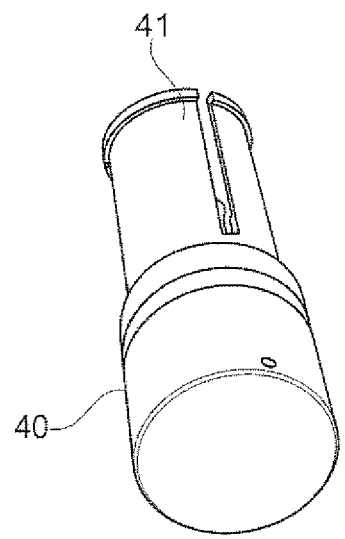
Figure 9:
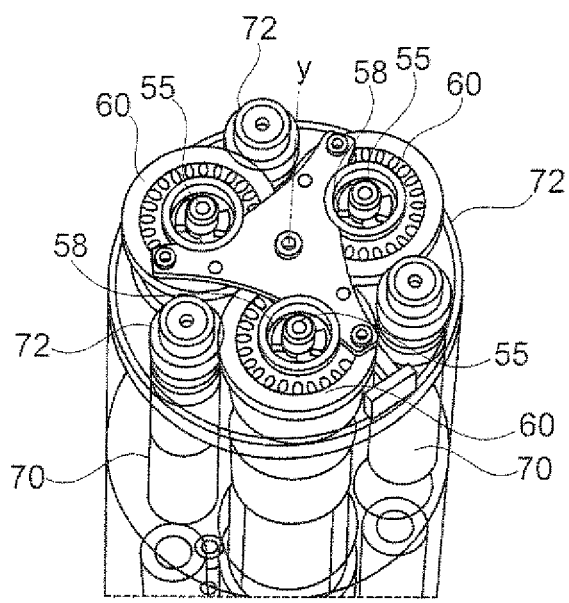
Figure 11:
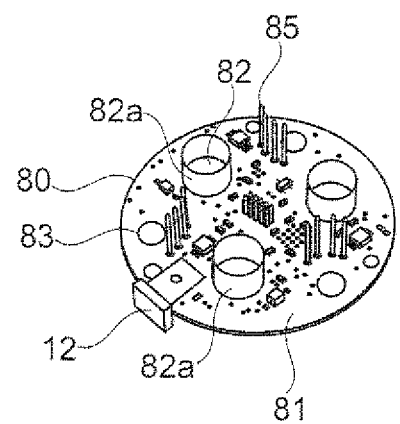
Figure 30:
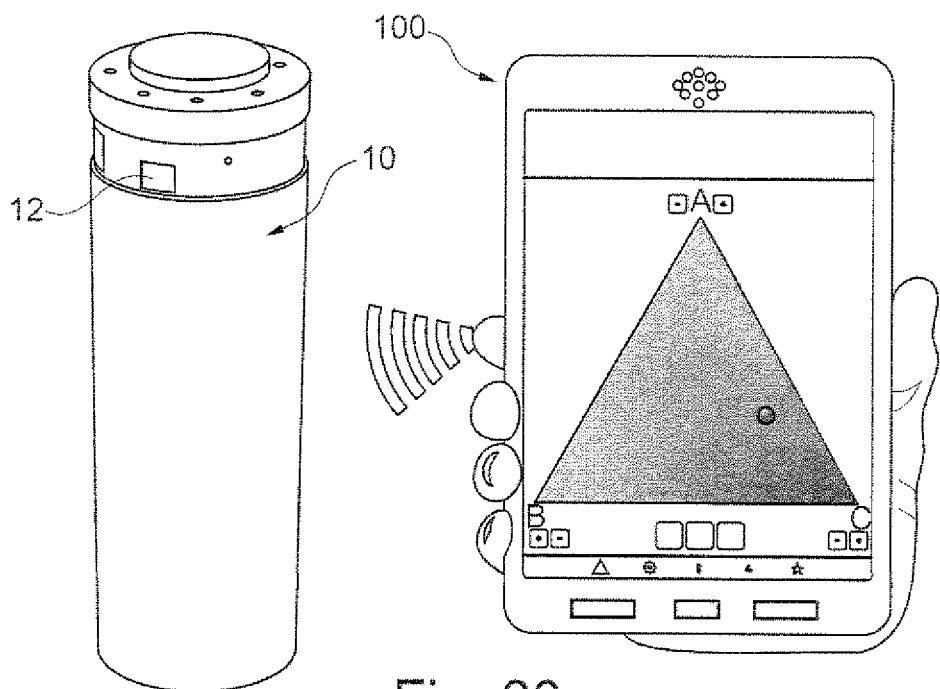
Figure 15:
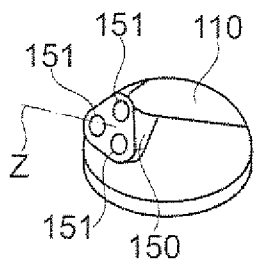
Figure 16:
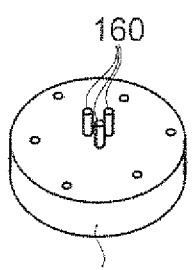
Figure 14:
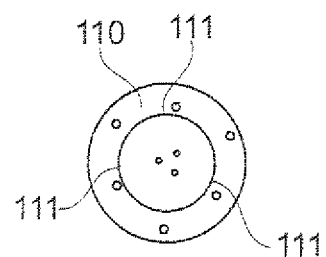
Figure 15A:
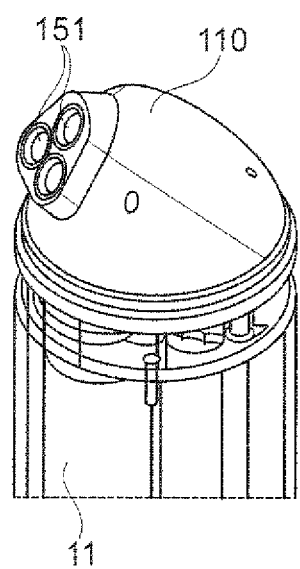
Figure 16A:
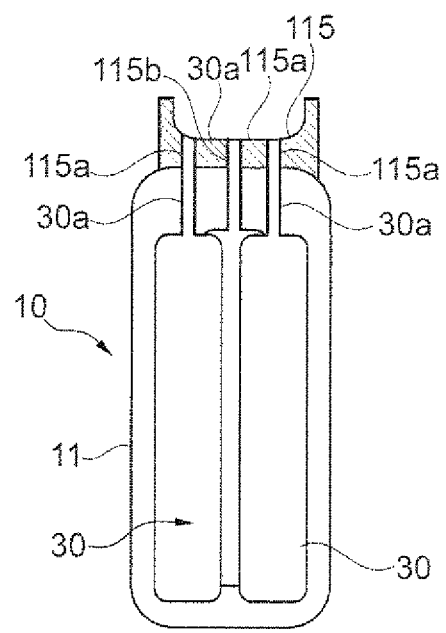
Figure 47:
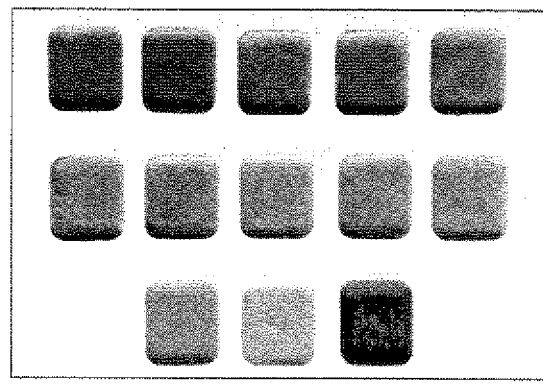
Figure 17:
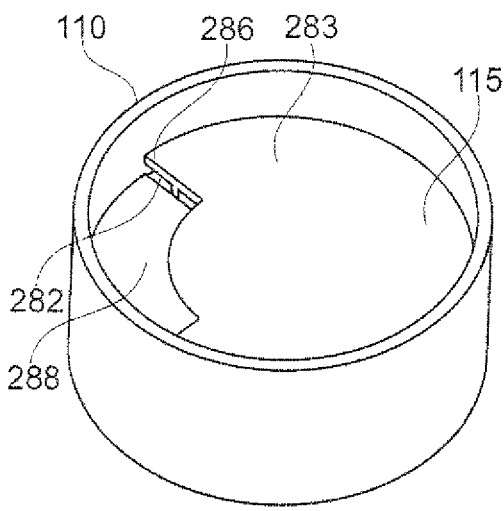
Figure 18:
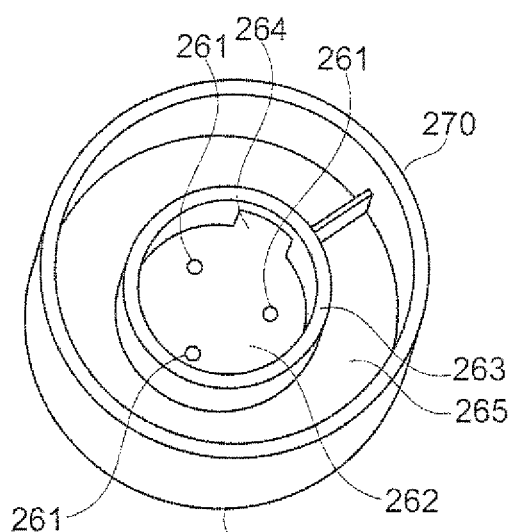
Figure 20:
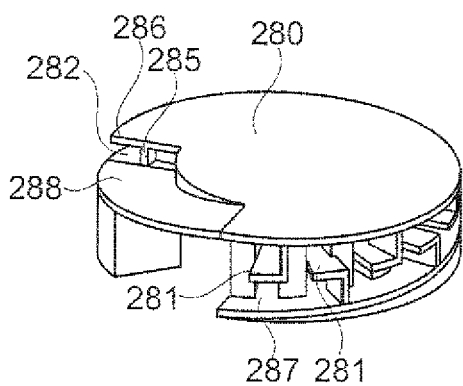
Figure 19:
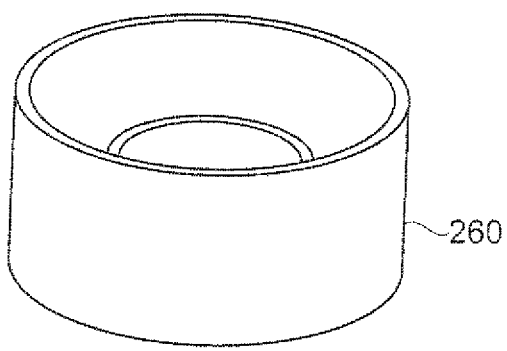
Figure 21:
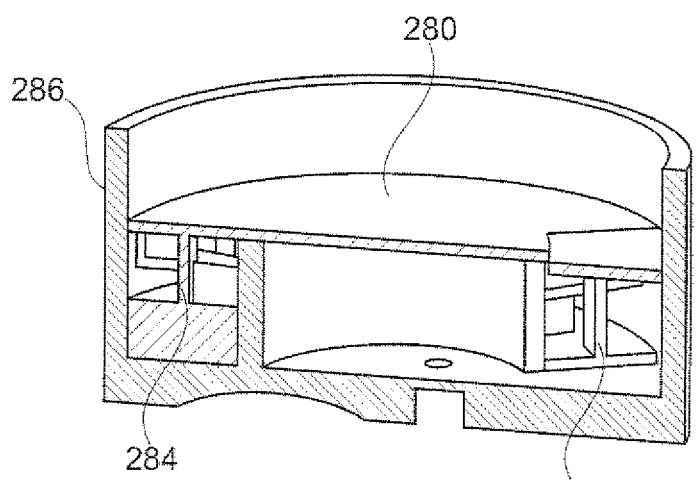
Figure 22:
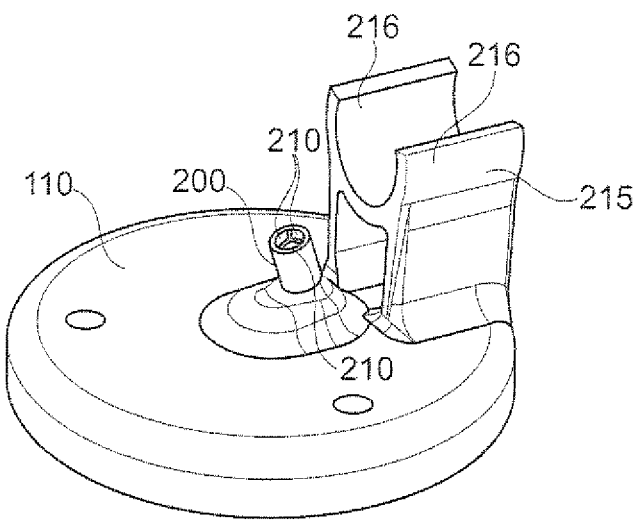
Figure 24:
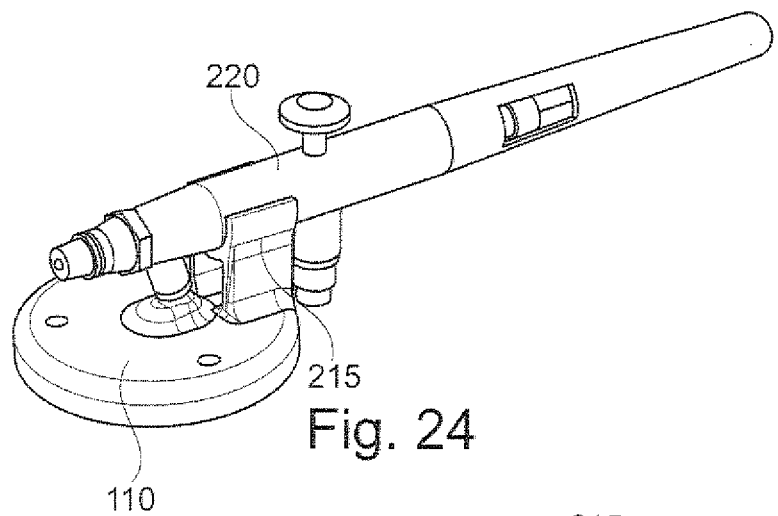
Figure 23:
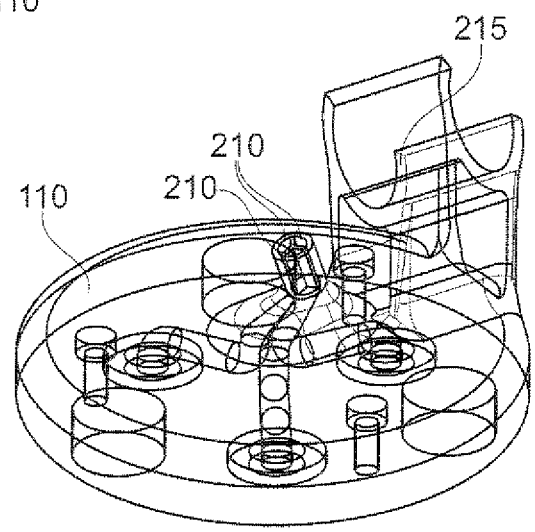
Figure 31:
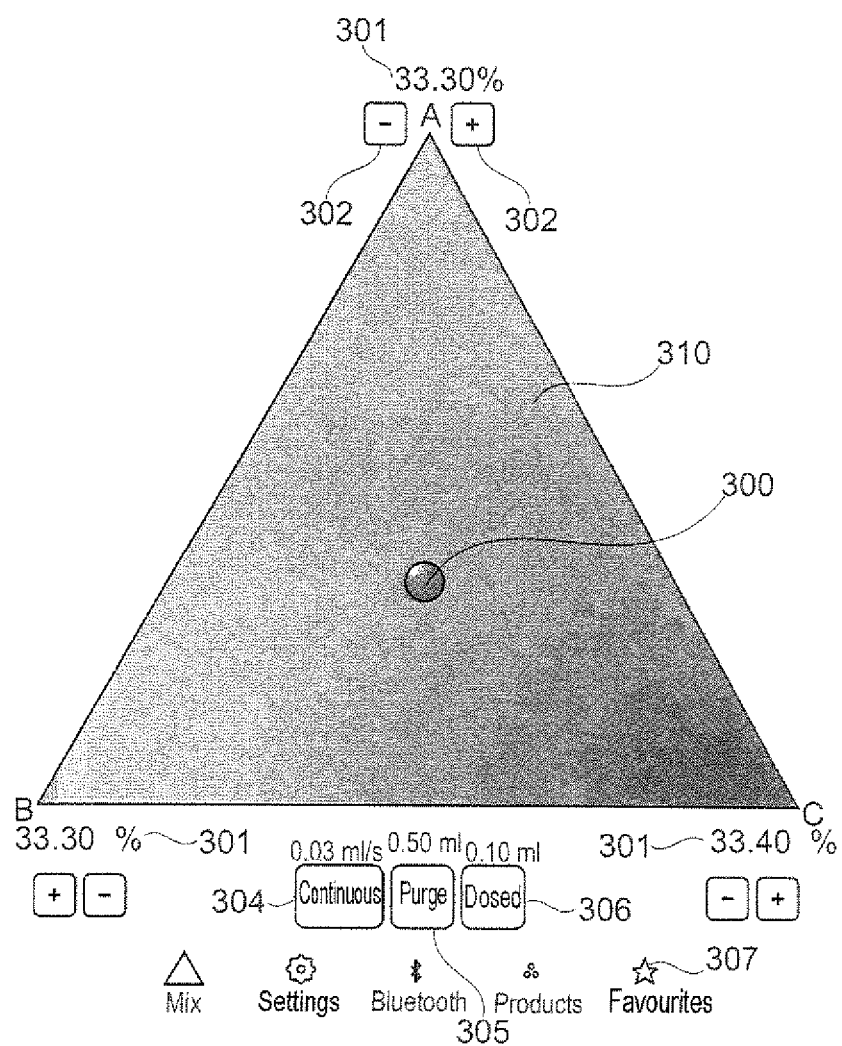
Figure 32:
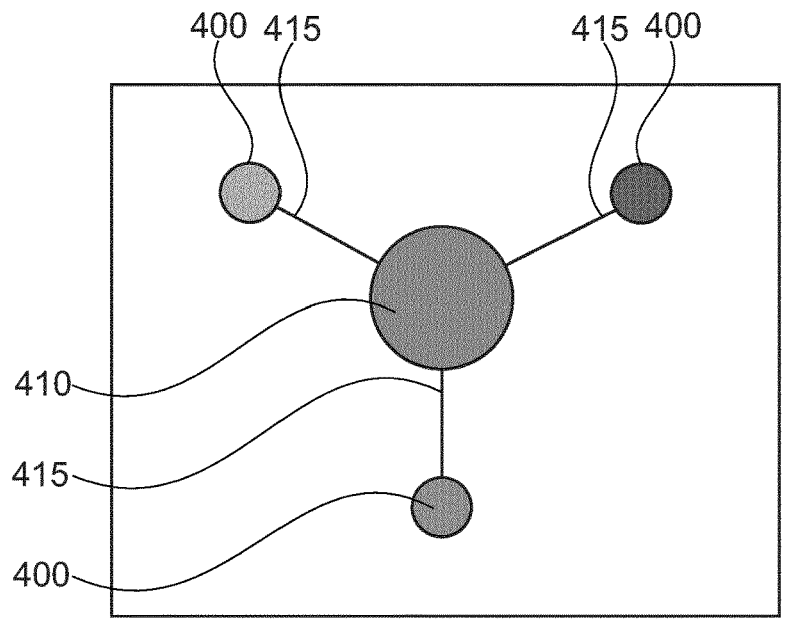
Figure 33:
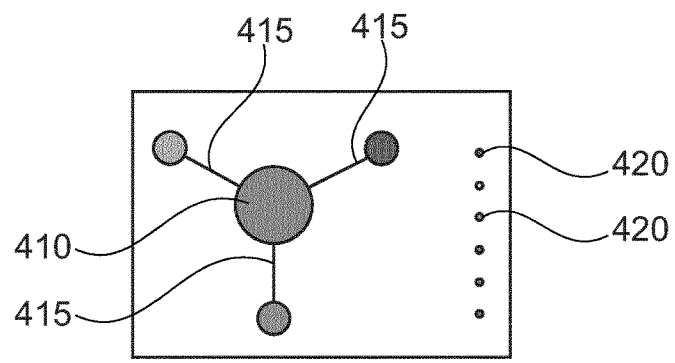
Figure 34:
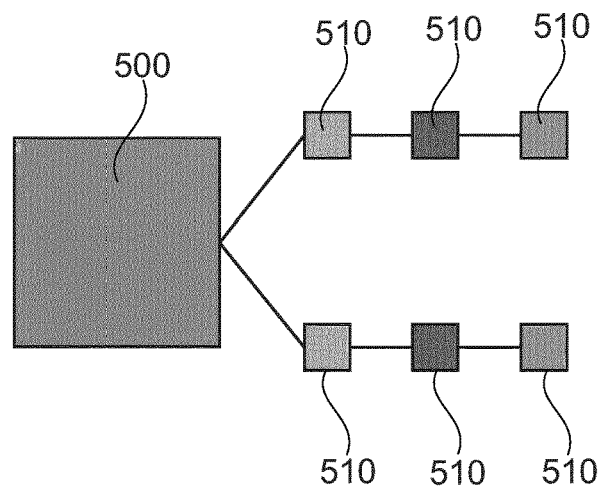
Figure 35:
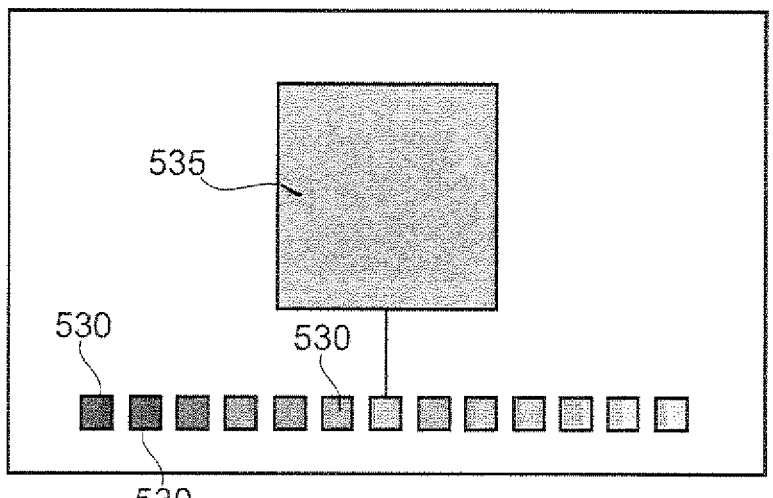
Figure 36:
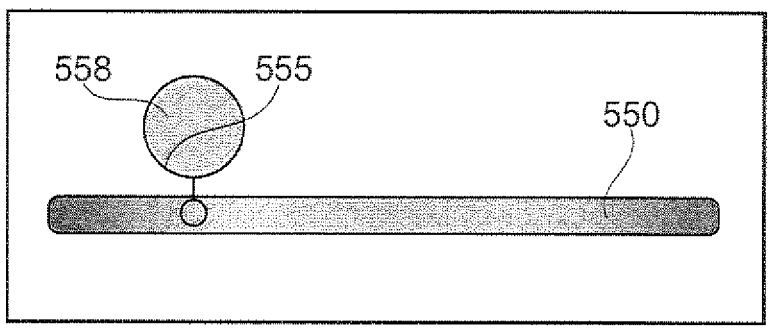
Figure 37:
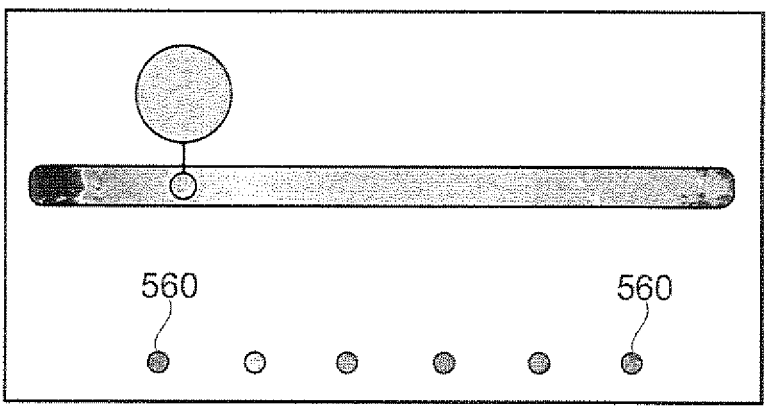
Figure 38:
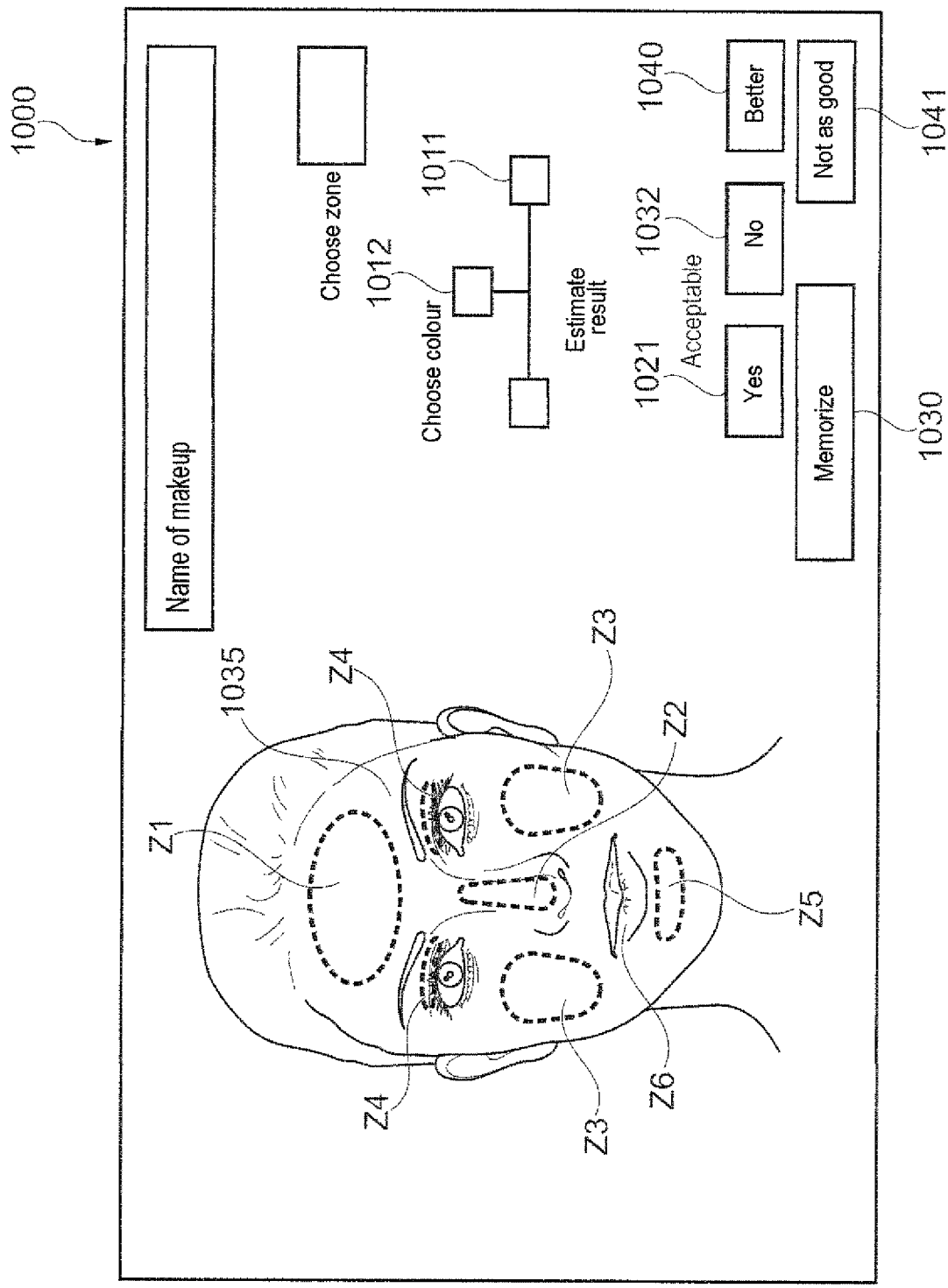
Figures 39, 46:
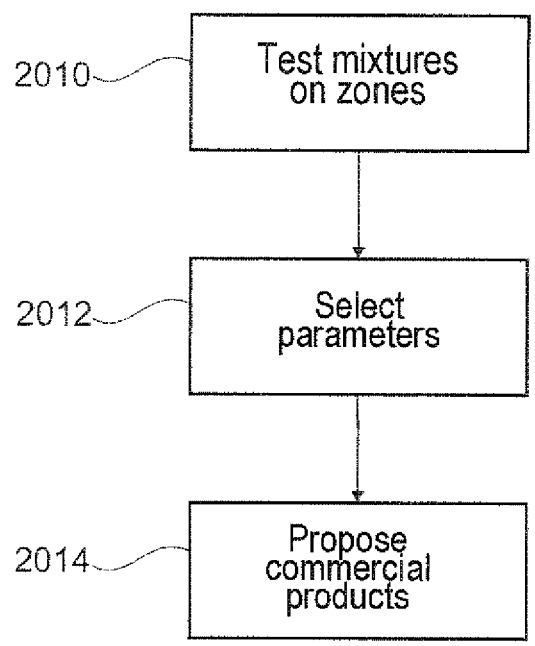
Figure 40:
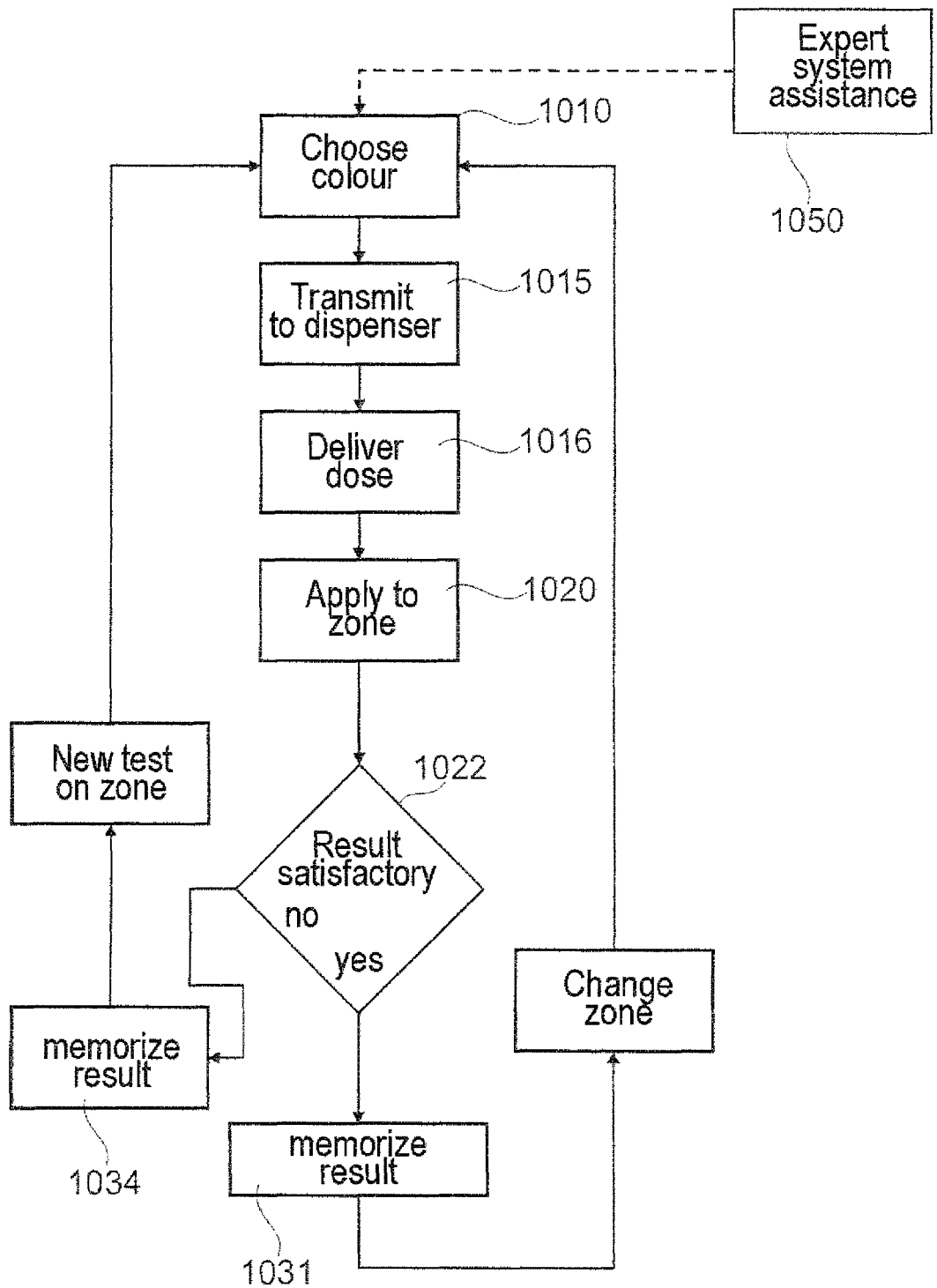
Figure 43:
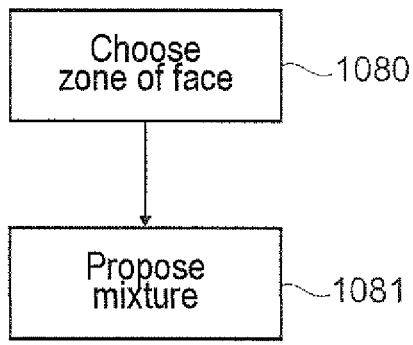
Figure 44:
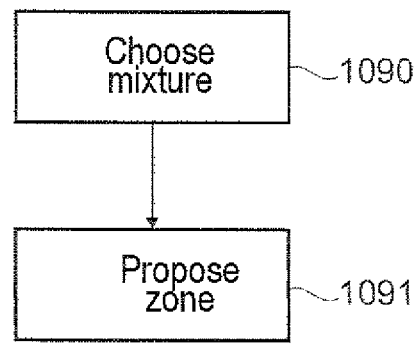
Figure 45:
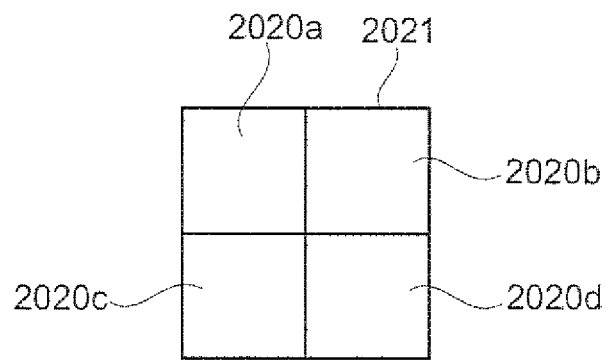
Figure 46:
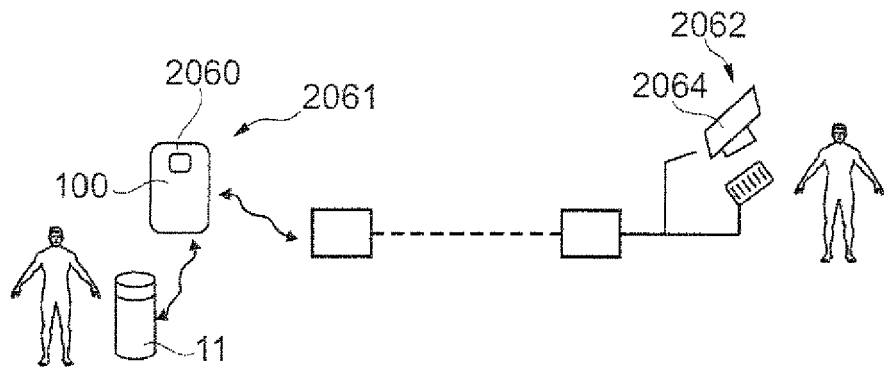

The invention may be better understood from reading the following detailed description of non-limiting implementation examples thereof and from examining the appended drawing, in which:

FIG. 1 is a schematic perspective view of one example of a dispensing system according to the invention, FIG. 2 is a rear view of the dispensing system of FIG. 1, FIG. 3 illustrates the picking up of product delivered by the dispensing system, FIG. 4 is a schematic perspective view, with certain components removed, of the dispensing system of FIG. 1, FIG. 5 separately and partially depicts a cartridge of base product for the dispenser, FIG. 6 depicts the top of the cartridge with the drive piece, FIG. 7 separately depicts the drive piece, in perspective, FIG. 8 separately depicts a support for the cartridge, FIG. 9 depicts the dispenser drive mechanism, FIG. 10 depicts one of the motors separately, coupled to the rest of the drive mechanism, FIG. 11 depicts an electronic board for controlling the motors, FIG. 12 is a cross section of the dispenser, FIG. 13 depicts the housing of the dispenser without the outlet interface, FIG. 14 separately depicts a first example of an outlet interface, viewed from above, FIGS. 15, 15A, 16, 16A and 17 depict other examples of outlet interfaces, FIGS. 18 and 19 are two other views of the outlet interface of FIG. 17, FIG. 20 separately depicts the static blender, FIG. 21 is a is an axial section of the outlet interface of FIG. 17, FIG. 22 depicts another outlet interface intended to collaborate with an airbrush, FIG. 23 depicts, showing hidden detail, the various passages of the outlet interface of FIG. 22, FIG. 24 illustrates the outlet interface of FIGS. 22 and 23 connected to an airbrush, FIGS. 25, 27 to 29, 29A, 29B and 29C depict other examples of outlet interfaces, FIG. 30 illustrates the operation of the dispenser using a portable terminal, FIG. 31 depicts one example of a graphic interface allowing the dispenser to be operated, FIG. 32 depicts another example of a graphic interface, FIG. 33 illustrates one example of how the graphic interface of FIG. 32 evolves as the device is being used, FIG. 34 depicts another example of a graphic interface, FIGS. 35 and 36 depict other examples of graphic interfaces, FIG. 37 illustrates how the interface of FIG. 36 evolves while the device is being used, FIG. 38 depicts a graphic interface of one example of a computer system according to the invention, FIG. 39 depicts one example of a look-up table, FIG. 40 is a block diagram illustrating steps of an example of a method according to the invention, FIGS. 41 to 44 are views similar to FIG. 40 of other examples of methods, FIG. 45 depicts one example of a support allowing the application of several different coloured compositions, FIG. 46 illustrates one example of an implementation of the invention, FIG. 47 illustrates a system allowing exchange of information with a remote advisor, and FIG. 48 illustrates a support comprising plurality of spaces containing different mixtures.

The dispensing system 10 according to the invention, depicted in FIGS. 1 and 2, comprises a dispenser 11 which is equipped in the upper part with an outlet interface 110 via which a cosmetic product of customized formulation is dispensed.

The dispenser 11 can be manipulated by one hand. Its length, excluding the outlet interface, is, for example between 140 and 160 mm and its diameter is between 40 and 60 mm.

The dispensing system 10 may as illustrated, comprise an actuating means for controlling the dispensing, for example a push-button 12. When the user depresses the push-button 12, the dispenser 11 delivers the product on the basis of information communicated to it beforehand by a computer system, for example using a wireless transmission as will be detailed later on. The operation of the push-button 12 may be programmed from an interface of the computer system, so as to deliver the mixture continuously for as long as pressure is applied, or to deliver only a predefined dose, irrespective of the length of time for which the user presses the push-button.

As visible notably in FIG. 4, the dispenser 11 houses several cartridges 30 each one containing a base product, the dispenser 11 allowing the quantity of each of the base products that is dispensed to be metered so that after the dispensed doses have been blended a product is obtained that has the desired properties.

Each of the cartridges 30 can be introduced into the housing of the dispenser 11 from the rear, as illustrated in FIG. 2. In the example considered, the dispenser 11 takes three cartridges 30, but the invention also extends to instances in which the number of cartridges 30 is different. In particular, certain aspects of the invention also apply to the case of a single cartridge housed in the housing of the dispenser.

A cartridge 30 has been depicted separately in FIG. 5. This cartridge comprises a body 31 in which a piston 32 can move along the longitudinal axis X of the cartridge so as to reduce the volume of a reservoir 33 situated under the piston 32 and containing the corresponding base product. The volume of the reservoir is preferably between 2 and 5 ml, being for example of the order of 3 ml.

The piston 32 is driven along the axis X by an externally threaded hollow rod 34 engaging with a corresponding screw thread that passes through the piston 32.

The rod 34 defines a passage via which the product contained in the reservoir 33 can circulate when the piston 32 moves in the body 31 in the direction of a reduction in volume of the reservoir 33.

The rod 34 is rotated about the axis X by a head 36 which can turn relative to the body 31, and communicates with a nozzle 37. Each cartridge 30 is mounted in the dispenser 11 with a support piece 40 which has been depicted separately in FIG. 8 and comprises an axially slit clamping sleeve 41 along which a locking ring 43, visible in FIG. 4, can slide.

When a cartridge 30 is fitted, the support piece 40 is engaged over it, on the opposite side to the nozzle 37, and the locking ring 43 is moved along the sleeve 41 to clamp the support piece 40 on the body 31. The support piece 40 allows the cartridge 30 to be immobilized in the housing of the dispenser 11.

The head 36 of the cartridge 30, which has the nozzle 37, is capped by a drive piece 50 depicted separately in FIG. 7, which grips the head 36 so as to be able to rotate about the axis X therewith.

When the drive piece 50 is turned about the axis X, its rotation is transmitted to the head 36, which can turn relative to the body 31 and drive the rod 34 in rotation with it.

The friction force of the piston 30 against the interior surface of the body 31 is enough to prevent the piston 32 from rotating relative to the body 31 so that the relative rotation of the rod 34 and of the piston 32 causes the latter to move along the axis X. This movement is accompanied by a reduction in the volume of the reservoir 33 and by base product contained in the cartridge 30 rising up through the rod 34 and then into the nozzle 37.

The drive piece 50 comprises an internal passage 52 fed by the nozzle 37 and which opens to the outside via a dispensing orifice 53. This passage 52 is formed by an end piece 36. The drive piece 50 has a mounting skirt 54 which axially covers the head 36 of the cartridge 30. This mounting skirt 54 connects via a transverse wall 55 to the end piece 56.

The end piece 56 has reliefs 57 allowing it to be coupled for rotation to a toothed wheel 60, visible notably in FIG. 9, belonging to a drive mechanism of the housing of the dispenser 11.

In the example considered, the reliefs 57 take the form of two diametrically opposed studs projecting from the end piece 56 at the base thereof and engaging in corresponding cutouts of the toothed wheel 60.

The end piece 56 has a narrowed portion which comprises a groove accommodating an O-ring seal 58. The narrowed portion connects via a shoulder 59 to the rest of the end piece.

The head 36 of the cartridge 30 may bear an O-ring seal which ensures sealed coupling between the nozzle 37 and the drive piece 50.

The drive mechanism comprises electric motors 70 equipped with reduction gears 71 visible notably in FIG. 10. The output shaft of these reduction gears is coupled to a driving wheel 72 which meshes with the toothed wheel 60.

In the example considered, the longitudinal axes X of each of the cartridges 30 are arranged at 120° to one another about the longitudinal axis Y of the housing of the dispenser 11.

The motors 70 are positioned between the cartridges 30, the axes of rotation of the motors likewise being placed at 120° to one another about the axis Y of the dispenser 11. This then makes for a compact design of dispenser 11.

The geared motor units advantageously have a torque in excess of 70 nN·m. For example, use is made of a Maxon 118392 motor combined with a Maxon 218418 planetary reduction gear set. Such a motor has a diameter of 10 mm, a power of 1.5 W, a nominal voltage of 3 V, an idling speed of 1300 rev/min and a maximum torque of 1.5 mNm. The reduction gear has a diameter of 10 mm, an absolute reduction ratio of 256/1 and a torque of 0.2 Nm.

An electronic circuit 81, depicted on its own in FIG. 11, is present near the top end of the housing of the dispenser 11. This electronic circuit 81 comprises a board 80 through which passages 83 pass for the output shafts of the reduction gears 71, and openings 82 pass for the narrowed parts 55 of the driving end pieces 56.

Sleeves 82a may be fixed to the board 80 to act as barriers against any leaks of product towards the board 80. The end pieces 56 pass through the sleeves 82a, preferably with a small clearance.

The board 80 bears the aforementioned push-button 12 and supports a certain number of output pins 86 used for powering the motors 70.

The electronic circuit 81 comprises a microcontroller or the like so that the various motors 70 can be operated with a view to dispensing the desired quantity of each of the base products. The resolution of the delivery of the base products is for example between 0.001 and 0.003 ml, being, for example, of the order of 0.0025 ml.

The housing of the dispenser 11 also houses a battery, the cells 89 of which are advantageously set out as can be seen in FIG. 4, each in the continuation of a motor 70.

For preference, as illustrated in FIG. 30, the dispenser 11 is operated via a computer system 100 such as a portable terminal, for example a smartphone, a tablet, for example of the "iPad" make or a laptop computer.

The dispenser 11 operating information in transmitted preferably wirelessly by the terminal 100, for example by a Bluetooth link.

In one particular example, the electronic board 81 allows control over the following:
 calculation of the volume of each product to be dispensed according to the volumetric fraction instruction for each product, the mode of operation (continuous, dose or purge), the value of the flow rate or of the volume,
 measurement of the currents powering the motors 70,
 Bluetooth communication with the computer system 100,
 management of the button 12 for the delivery of products,
 management of the on/off switch,
 management of the display of the LED or LEDs,
 charge of the battery.

The board 80 for example comprises the following components:
 a Texas Instruments CC2541 microcontroller,
 a blue CMS LED to provide the user with status information,
 a thermal cutout fuse,
 a 32 MHz quartz oscillator,
 an on/off switch.

The Texas Instruments CC2541 microcontroller incorporates a programmable flash memory with 256 kb of RAM and numerous functionalities. This microcontroller may be programmed in C, in the IAR Embedded Workbench environment.

The outlet orifices 53 of the cartridges 30 open substantially at the top end of the housing of the dispenser 11, as may be seen notably in FIG. 13. The upper face 14 of the housing of the dispenser 11 defines a mounting surface for mounting an outlet interface which channels the products from the cartridges towards a pickup or dispensing zone.

In the example of FIG. 1, this outlet interface 110 takes the form of an added component that has been depicted on its own in FIG. 14 and which at its periphery, as illustrated, has passages 111 for screws used for fixing it to the housing of the dispenser 11.

The outlet interface 110 in this example defines a cup 115 into the bottom of which the supply orifices 116 open, each orifice being in communication via an internal duct at the outlet interface 110 with a respective outlet orifice 53.

Thus, in the example considered, the base products contained in the cartridges 30 can be dispensed into the cup 115 without mixing with each other.

When using the dispenser 11, the user can fill the cup 115 with predefined proportions of each of the base products, as illustrated in FIG. 3, then pick up the product present in the cup 115 with a view to applying it. This pickup may be performed for example using a finger, as illustrated, or using any suitable cosmetic applicator. The cup 115 is preferably fairly shallow, making it easier to clean, and of a diameter large enough not to hamper access to the product. The depth p of the cup 115 is thus preferably between 1 and 5 mm and its diameter d or that of the circle circumscribing it when the contour of the crucible is not circular, is preferably between 20 and 50 mm. For preference, $\leq d/p \leq 50$. The supply orifices 116 preferably have a diameter smaller than 3 mm, and for example of the order of 1 mm.

The outlet interface 110 may accept a lid 118 for closing the cup 115, to prevent the product from drying out or being exposed to dirt when not in use. This lid 118 is preferably made of a transparent plastic and may be fixed to the upstand of the cup 115, or more generally to any suitable point of the outlet interface 110, by friction, screwing or clipping.

The maximum capacity of the cup 115 is preferably between 0.02 and 0.25 ml.

For preference, the volume defined by the volumes of the internal passages of the outlet interface 110 between the inlet thereto from the supply orifices 53 to the supply orifices 116 is less than or equal to 0.4 ml.

The housing of the dispenser 11, in the configuration thereof illustrated in FIG. 13, which means to say without the outlet interface 110 described above, has the advantage that it can be coupled to various forms of other outlet interfaces, depending on the making-up that is to be performed and/or on the zone that is to be treated.

Thus, FIG. 15 depicts an alternative form of outlet interface 110 comprising a dispensing end piece 150 oriented generally along an axis Z which extends obliquely with respect to the longitudinal axis Y of the dispenser 11. Three internal passages communicate respectively with the outlet orifices 53 of the various cartridges 30 and open to the end of the end piece 150. The outlet interface 110 can be fitted at one end of the housing of the dispenser 11 as illustrated in FIG. 15A.

Figure 27:
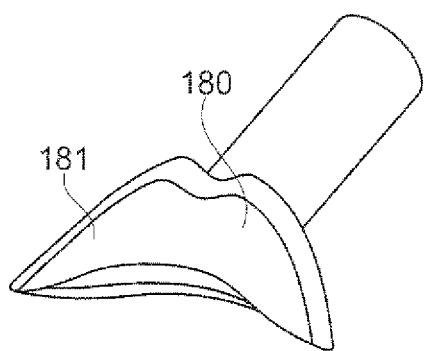
Figure 28:
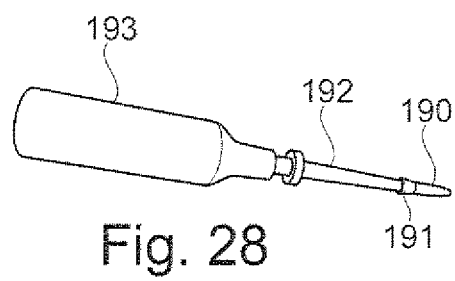

In the alternative form of FIG. 16, the outlet interface 110 comprises three nozzles 160 which communicate respectively with the outlet orifices 53. These nozzles 160 are grouped together at the centre of the outlet interface 110, which means that an end piece 170 for example, for applying product to the eyelashes, as illustrated in FIG. 25, a porous end piece 180 for application to the lips, as illustrated in FIG. 27, or a flocked end piece 190 such as a felt tip, as illustrated in FIG. 28, can be mounted on them.

Figure 25:
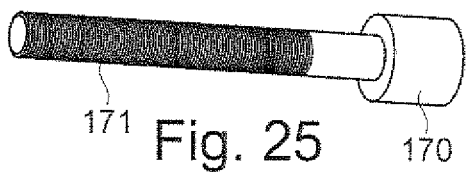

In the case of the end piece 170 of FIG. 25, this for example as illustrated comprises transverse striations 171 between which the product supply orifices open. The mixing of the various base products may take place within the end piece 170, thanks to an in-built static mixer for example.

The end piece 180 comprises for example a part made from open-cell foam, in the shape of the lips. The base products may be blended within an internal duct of the end piece 180.

The end piece 190 may comprise a porous application member 191, at the end of a wand 192, which connects to a base 193 used for mounting on the rest of the outlet interface of FIG. 16.

FIG. 16A schematically illustrates the possibility of having, by way of outlet interface 110, a cup 115 with passages 115a for outlet ducts 30a of the cartridges, even when these ducts are used for driving the threaded rods in rotation for moving the pistons. The length of the ducts 30a is such that these open into the bottom 115b of the cup or near to the bottom thereof, without protruding thereinto.

For preference, the internal section of the ducts 30a is small, in order to minimize the dead volume.

In the example of FIGS. 22 to 24, the outlet interface 110 comprises an end piece 200 which is oriented generally obliquely with respect to the longitudinal axis Y of the dispenser. This end piece 200 has internal passages 210 running through it, these respectively communicating with the outlet orifices 53 for the base products coming from the cartridges 30.

The outlet interface 110 comprises a mounting part 215 which allows an airbrush 220 to be fixed to the outlet interface 110 as illustrated in FIG. 24. The end piece 200 is fixed in place of the usual reservoir of the airbrush and the passages 210 open into the spray nozzle of the airbrush where they are subjected to the depression created by the speed of the stream of the entrainment air.

A clip is formed by two uprights 216 to accept the body of the stylus of the airbrush 220 and hold it in place by clip fastening.

For preference, the orientation of the end piece 200 is such that it allows the axis of spraying to be oriented substantially at right angles to the longitudinal axis of the housing of the dispenser 11. This housing can then be used as a handle for manipulating the airbrush.

The outlet orifices 210 are advantageously very close together, being separated by fine internal partitions of the end piece 200.

For preference, the cross section of each of the outlet orifices is less than or equal to 3 mm$^2$ over a length of at least 5 mm.

Figure 29A:
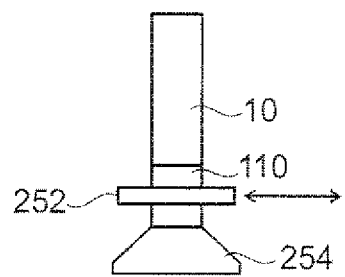
Figure 29B:
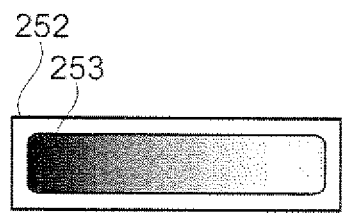
Figure 29C:
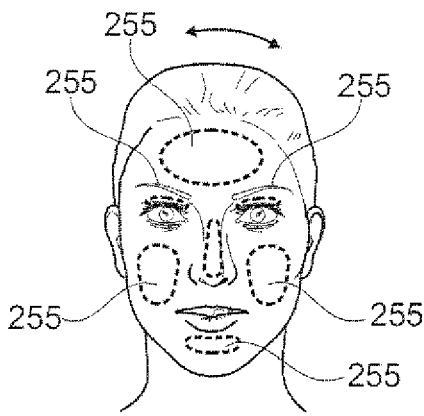
Figure 29:
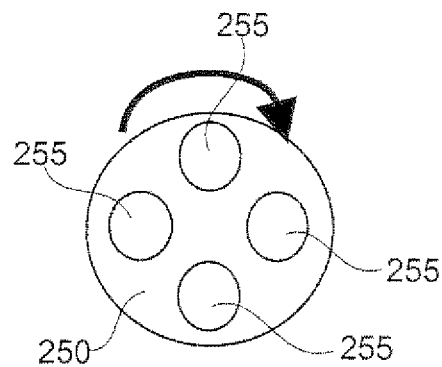

The housing of the dispenser 11 may also be equipped in the upper part with a support that is able to move with respect to the housing, for example in the form of a turret 250 as illustrated in FIG. 29.

This turret 250 rotates for example about an axis of rotation that coincides with the longitudinal axis Y of the dispenser.

The turret 250 may comprise several spaces 255 each able to accommodate the products delivered by the dispenser 11 in a corresponding filling position. In order to fill the various spaces in succession, the turret 250 is made to rotate, for example by a quarter-turn each time. The presence of several spaces 255 may allow products of different formulations, made from different base products, to be dispensed for example so as to vary the shade of the products present in the various spaces 255.

FIG. 29C illustrates a support with spaces arranged thereon substantially like the various zones of a face; each space may contain a mixture, the colour of which is suited to the corresponding part of the face. Thus it is easy for the user to know where to apply the mixture taken from a given space.

The dispenser 11 can be used to dispense a mixture, the formulation of which changes over time and to collect the mixture in a container able to move with respect to the dispenser so that the mixture is deposited in a location of the container that varies over time, so as to achieve a graduated effect.

For example, as illustrated in FIGS. 29A and 29B, the dispensing system comprises an outlet interface 110 comprising a part that is fixed relative to the dispenser and a moving part 252 that has a space 253 to accept the mixture. For example, the dispenser 11 is arranged in this case with the outlet orifices of the cartridges downwards and is equipped with a mixer so that the mixture falls into the space 253 under its own weight. A motor may move the moving part of the outlet interface relative to the dispenser, in a manner that is synchronized with the variation in characteristics of the mixture, so that a graduated effected is obtained all along the space 253, as illustrated in FIG. 29B.

The dispensing system may comprise a stand 254 which keeps the dispenser head down.

The outlet interface 110, notably when it comprises a cup, may comprise a static mixer which blends the base products.

FIGS. 17 to 21 depict an outlet interface 110 comprising such a static mixer.

This outlet interface 110 may comprise an exterior body 260 which fixes to the housing of the dispenser 11 and has an external tubular upright 270.

The body 260 comprises passages 261 for admitting the various base products. These passages 261 open into a central chamber 262 delimited by an internal tubular upright 263.

This upright 263 has passing through it an opening 264 which opens into an annular space 265 between the internal upright 263 and the external upright 270.

A static mixer core 280, depicted on its own in FIG. 20, is placed inside this space 265.

The central chamber 262 may communicate with a peripheral chamber comprising a series of partitions formed by the core of the mixer and which act as deflectors for the mixture and create shear therein.

The peripheral chamber may comprise a perforated annular partition 284 defining perforations 285 of which one is visible in FIG. 21, through which the mixture passes as it circulates through the peripheral chamber. The central and peripheral chambers may be closed at the top by a wall 286 which defines the end wall of the cavity receiving the mixture.

The end wall 287 of the peripheral chamber may be of helical shape and of a height that decreases with closeness towards the outlet. The latter may open ahead of a connecting ramp 288 connecting the end wall 287 of the peripheral chamber and the top wall 286 of the mixer, this connecting ramp preferably being a portion of a helix extending the helix formed by the end wall of the peripheral chamber.

For preference, the peripheral chamber comprises the aforementioned annular partition and radial partitions 281 which force the mixture to circulate alternately between upper and lower regions of the peripheral chamber and between radially inner and outer regions, the mixture circulating for example from an upper and radially outer region to a lower and radially outer region by passing through the aforementioned annular partition.

The body 260 radially closes the peripheral chamber on the outside.

The outer body 260 of the mixer and the core 280 of the mixer may each be produced as a single piece by injection moulding.

The product reaches the core 280 of the static mixer via the passage 264 then circulates between the uprights 263 and 270 over practically a full circumference until it reaches the outlet 282.

The numerous chicanes imposed by the partitions 281 cause intimate mixing of the components introduced into the outlet interface 110. The mixture obtained can be picked up by the user in the space 283, above the static mixer.

As indicated previously, the dispensing system 10 according to the invention preferably comprises a man-machine interface that allows the user easily and intuitively to operate the dispenser 11. This interface may form part of a computer system 100 which communicates with the dispenser 11.

FIGS. 31 to 37 depict various examples of touch-sensitive interfaces that may allow the user to select the colour of the mixture resulting from the metered dispensing of the various base products.

This interface may have, as illustrated in FIG. 31, a colour selection zone, for example in the form of a triangle, the vertices of which correspond to the colours of each of the base products contained in the cartridges.

The user can move a cursor 300, for example in the form of a ball, relative to the vertices A, B and C of the triangle.

The closer he brings the cursor 300 to one of the vertices, the larger the fraction of the corresponding base product with respect to the total quantity of the various products dispensed.

The fraction of each product with respect to the total quantity may be indicated at 301 by a numerical value on the interface.

The interface may allow the user to increment or decrement the quantity of each of the products, for example by operating control buttons 302, which allow precise adjustment of the quantity of each of the base products.

The surface of the triangle 310 may have a colour that various locally so as to be indicative at each point of the colour of the mixture that results from the weighting of the various base products in the proportions corresponding to the relative coordinates at this point.

The interface may have a button 305 providing access to a specific menu for adjusting the volume of product dispensed for purging the dispenser.

The interface may also advantageously allow the flow rate of product to be adjusted using buttons 304 and 306 returning to a specific menu for adjusting the flow rate.

In the example considered, the interface offers the choice between a continuous dispensing mode, using the button 304, in which the products are dispensed for as long as the user is pressing on the control button 12.

The corresponding dose can be transmitted to the interface and displayed.

The button 306 allows selection of a dose mode of operation during which even a brief press of the button 12 triggers the dispensing of a predefined dose.

In order to vary the flow rate, the dispenser acts, for example, on the operating duty cycle of the motors.

The interface may be designed to allow the user to program or memorize the settings he or she prefers, using a menu 307 providing access to favourites.

The touch-sensitive interface illustrated in FIG. 32 shows on the screen three coloured zones 400, each one corresponding to the colour of one of the base products contained in the dispenser 10, and a central zone 410 which shows the colour of the resulting mixture.

The relative quantity of each of the base products can be adjusted using cursors 415 which move for example along lines joining each of the zones 400 to the central zone 410.

During use of the interface, the latter may memorize a given setting and cause a button 420 of the colour of the mixture to appear on the screen. The user can then, simply by pressing this button 420, dispense a mixture of the corresponding colour.

In the example of FIG. 34, the interface in a zone 500 displays a given shade and, by control buttons 510, each in the colour of the corresponding base product, offers the user the opportunity to increase or decrease the proportion of this base product in the final mixture. The colour of the zone 500 is recalculated according to the actions on the control buttons 510.

In the alternative form of FIG. 35, the interface shows a colour chart having several zones 530 each one corresponding to a particular proportion of the various base products.

The user may select one of these zones, for example by pressing it with his or her finger.

The interface may be designed to display the selected colour to a larger scale in a zone 535. The programming of the dispenser 11 to dispense this colour is triggered for example by the pressing of the zone.

In the example of FIG. 36, the user may move a cursor 555 over a continuous colour chart 550, causing the selected colour to be displayed in a zone 558. The user can then, for example by pressing the zone 556, trigger the sending to the dispenser 11 of the necessary instructions for the dispenser to dispense a product in the selected colour.

It may be seen from FIG. 37 that the interface can memorize the various shades selected and then display them on the screen so as to allow the user, by pressing corresponding buttons 560, very easily to select again a shade that has already been chosen.

FIG. 38 depicts an example of a user interface 1000 of a dispensing system comprising a dispenser, preferably as described hereinabove, and a computer system 100 to which the interface belongs.

The computer system here for example comprises a device such as a laptop computer, a tablet or a smartphone, operating autonomously or connected to a remote server.

In the example considered, the interface 1000 is defined by the touch screen of such a device. In an alternative form that has not been illustrated, the dispenser incorporates a touch screen or any other type of man-machine interface and can be used without connection to another device.

The device runs an application, for example which has been downloaded beforehand and which on the screen displays a face 1035 and a series of buttons allowing the user to input information.

The face may comprise several zones Z1 to Z6 that can be selected by touch, for example the forehead, the nose, the cheeks, the eyelids, the chin and the lips.

The buttons present on the screen may for example make it possible to input the name of the makeup or of the user, display the selected zone, choose the colour, and inform the computer system as to whether or not the result of the test run is acceptable, or even as illustrated provide information regarding the assessment of the result relative to a test run previously, namely, for example, better or "not as good". The screen may also display a button allowing the choice of a colour and a zone to be memorized after a test has been performed with this colour on the zone in question.

The choice of colour is made for example with a colour scale similar to the one described with reference to FIG. 36.

The computer system is designed to memorize the data in the form of a look-up table for example, so as to associate a zone of the face with the parameters that allow the mixture dispensed during the test to be reproduced. These parameters include, for example, the relative contents of each of the base products of the dispenser in the mixture, the quantity Q dispensed, as well as additional data such as, for example, the name of the zone, the date the mixture was dispensed and/or any other mixture identifier, identifiers of the base products, period of the year, notably the season, the age of the user, his or her sex, his or her given or family name, the name of an event associated with the makeup, for example a birthday, amongst other data, and the quantity of product suitable for the zone. The ancillary data may allow the user to reproduce more easily a makeup look considered suitable for a time of year or recalling a life event or to give a rejuvenating effect.

These data may be memorized in the computer system 100, for example in the aforementioned device and/or on a remote server with which the device is in communication, or alternatively in an electronic memory incorporated into the dispenser 11.

Thus, according to the invention, the user may make the dispenser deliver a first coloured substance, and apply it to a first zone of the face, then judge whether or not it is suitable. If the result is satisfactory, the user may record it, indexing it to the zone; if the result is unsatisfactory, the user may command a new colour in order to repeat the above operations.

The computer system can be used in this context in various ways.

For example, as illustrated in FIG. 40, the user has in a step 1010 selected a colour to test, for example using the colour scale 1011 displayed on the screen, by moving the adjusting button 1012.

Next, the choice of colour is transmitted to the dispenser 11, in step 1015. For example, the device transmits the quantities of each of the base products to be dispensed and the electronic circuit 81 takes charge of operating the motors accordingly.

In step 1016, the user presses the control button 12 of the dispenser 11, and this for example causes a dose of the mixture, in the colour selected by the user, to be dispensed.

The mixture is, for example, dispensed into the cup 115 then picked up and applied by the user to the cheeks or any other zone instructed on the interface, in step 1020.

In alternative forms, the product is applied using an airbrush or by any other means as described above.

The user then in step 1022 informs the computer system of the result using the buttons 1021.

If the user indicates that the result is satisfactory, the system then suggest for example that he/she validate the parameters of the test using a button so as to memorize these parameters in step 1031.

If the user does not consider the result to be satisfactory and makes this known using the button 1032, the result can nevertheless be autosaved in step 1034.

Thus, each zone can be indexed not only with the colour or colours that are suitable, but also with the colour or colours that are not at all suited to this zone.

The user can then perform a further test on the same zone by returning to step 1010.

If the user is satisfied with the result, he or she may also wish to carry out a further test, for example on a different zone of the face.

If appropriate, if the user is not satisfied, the interface may suggest that the user indicate whether the result is considered better than or not as good as the previous test, using corresponding buttons 1040 and 1041.

In that case, the computer system may be designed to determine whether, in the light of the information input by the user, a proposal can be automatically made as to what colour to test next.

If appropriate, a questionnaire may be displayed to assist the computer system in proposing a colour in the light of the tests performed and the way in which the user or a professional assisting the user has assessed these tests.

For example, if the colour is considered "unsuitable" the system may receive from the user additional information for example "too light" which will assist the system in proposing a new colour better suited to the user's expectations.

It may be advantageous for the computer system to be able to receive information comparing the result against the previous tests, for example "it's better" or "it's not as good" and from there, for the system to be capable of deducing what new colour to propose.

Another option is for the computer system to be able to receive comparison information regarding a comparison against a target, for example "it's almost ideal" and for the system to be capable, from there, of automatically adjusting its colour modifications. In this particular instance, if it receives the information that the desired result has almost been achieved, the system can adopt small levels of colour change and revise the colorimetric scale of adjustment accordingly.

If the dispensing system itself proposes the coloured mixtures to be tested, these may be based on preprogrammed test scenarios and the system may alter how the scenario is followed through according to the successes or failures of the assessment. Thus, for example if, from the third application of product it receives information that the colour is almost ideal for the user, the dispensing system may exit the program and thereafter allow itself to be guided by instructions from the operator.

In general, the user may be assisted by an expert system in the choice of colours to test.

Figure 42:
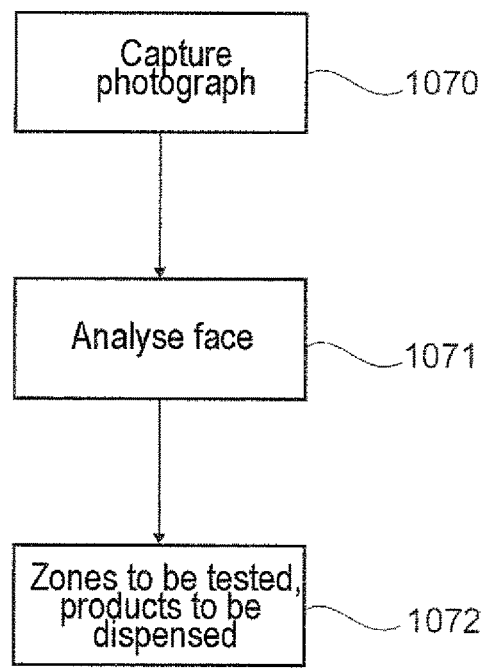

This expert system is, for example, a program run on the device with which the dispenser communicates or on the dispenser itself, and which is based on the answers to a questionnaire and/or on measurements, for example of the colour of the skin, taken by a specific sensor or by a camera. The user can thus get assistance from an instrumented evaluation, for example a colour sensor. The expert system can even be implemented on a remote server with which the device or the dispenser exchanges information. The operator may even send an image of his or her face to a specialist who can preprogram the starting colour choice. In another exemplary embodiment, the user presents the computer system with a photo of his or her face and the computer system is designed to analyse this and create a program defining the zones to be tested and the first products to be dispensed, both in terms of colour and in terms of quantity. For example, the computer system may be designed to select automatically the colours of makeup to propose to the user by capturing a photograph in step 1070, as illustrated in FIG. 42. For example, the device which communicates with the dispenser 11 is equipped with a camera, and the user takes a photograph of his or her face. The image is then analysed in step 1071, and colours are proposed for each zone of the face in step 1072, for example in accordance with predefined colour combination rules.

The dispensing system may be oriented by the user to decide on the colour and also on the quantity of product to be dispensed. For example, the user may indicate "nose" or "blemish" and the dispensing system is designed to adapt the dose dispensed according to a memorized map of doses to be dispensed according to the zones to be treated.

The computer system may guide the user in the choice of colours in the mixture to be tried, so as to limit the number of tests needed until the user obtains a result that pleases him or her.

Figure 41:
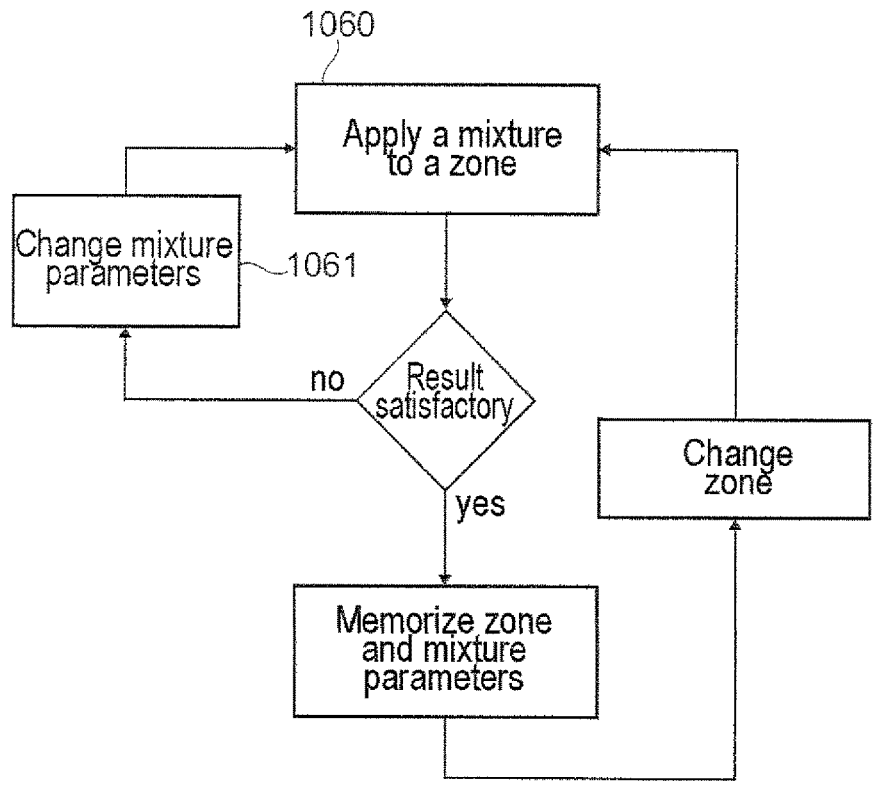

It is thus possible, as illustrated in FIG. 41, that after a mixture dispensed by the dispenser has been applied to a given zone of the face in step 1060, the computer system will ask the user whether or not the result is satisfactory and will of its own accord, if the result is considered to be unsatisfactory, make a change 1061 to the dispenser parameters in order to modify the mixture dispensed. The user then has only to perform a new test with the modified mixture.

When a mixture is notified as being satisfactory, the computer system can memorize the corresponding parameters so as to allow the mixture to be recreated at a later date.

The system can then begin the above steps afresh for a new application zone.

During the successive tests, the operator does not need to treat the entire face. He or she may for example choose between 3 and 8, for example 5, small-area zones. The dispensing system is then advantageously designed to interpolate and/or extrapolate the data regarding the colours considered to be suitable, so as to calculate the colours that ought to be considered suitable for zones for which the exercise has not been conducted.

At the end of the learning stage, the system may generate a display of the tested or calculated colours that are suitable on the various zones.

The dispensing system may be designed to indicate whether certain colours appear to be incorrect, doing so on the strength of a comparison against standard maps it has in memory. Thus it may propose that the user repeat all or some of the mapping exercise.

Once the computer system has completed its learning, which means to say once the colours of mixtures have been identified as being agreeable to the user for making-up certain zones, the user wishing to apply makeup has only to call up the zone that is to be made up, in step 1080 of FIG. 43, and the system will be able automatically to propose a suitable colour of mixture to the user in step 1081.

In the alternative form illustrated in FIG. 44, the user selects a colour in step 1090 and the computer system in step 1091 proposes a zone in which to apply a mixture of this colour, on the basis of information previously collected on the basis of the tests performed.

The zone proposed is, for example, the zone at which an identical or very similar colour has already been applied and the result considered acceptable by the user.

FIG. 46 illustrates one example of an implementation of the invention in which, having carried out tests on various zones in step 2010, the user informs the system of the mixture or mixtures he or she considers to afford the best result, this allowing the system to know the corresponding parameters in step 2012. Next, in step 2014, the system may propose to the user references of commercial products that have the same properties or very similar properties.

In an alternative, the system sends the parameters to a remote manufacturing centre so that a composition that has the same formulation or the same properties as that of the mixture that the user has tested and found to be satisfactory can be produced.

FIG. 45 illustrates the possibility of using the dispenser to dispense several doses 2020*a* to 2020*d* of different mixtures, next to one another on a support 2021, so as to allow these to be applied to adjacent distinct regions of the same zone.

The user can, in a single hit, apply a series of colours in order rapidly to home in on the appropriate colour. The coloured substances present on the support 2021 may have been chosen by the operator him- or herself or proposed by the dispensing system.

The support 2021 is, for example, able to move with respect to the housing of the dispenser and is moved sequentially to deposit the corresponding mixtures in the various zones 2020a to 2020d, being for example similar to the supports described with reference to FIG. 29 or 29A. The user can thus easily compare the results between the various regions and inform the system of which mixture produces the best effect.

FIG. 47 illustrates a system that assists the user in applying makeup, notably in choosing the correct colourings.

This system makes it possible to establish a video link, for example over the Internet, between a camera 2060 on a first site 2061 and a second site 2062.

The camera 2060 is, for example, built into a tablet or a smartphone that constitutes the computer system 100.

The second site 2062 is allowed to operate the dispenser 11 present on the first site 2061 either directly or indirectly. Thus, the person present at the first site can apply the mixture dispensed and send to the second site 2062 a corresponding image, and in return receive information relating to the result of the makeup.

The second site 2062 may comprise a viewing screen 2064 that allows an advisor sitting at this screen to see the result of the makeup with the mixture dispensed by the dispenser and advise the person who has applied the makeup. This advisor may in return influence the dispenser 11 to modify the colour of the mixture and better suit it to the face of the person present at the first site. The protocol for the exchange of data between the two sites thus allows command instructions to be sent to the dispenser 11, either directly or via the computer system 100 present at the first site. Thus, the person present on the second site controls the mixture delivered by the dispenser 11. The first person can apply makeup under the gaze of the second. The second person sees the result of the test on his or her screen and can thus correct the mixture which will be commanded remotely, until the ideal makeup is achieved.

For preference, the video link between the two sites is a two-way link, so that the user present on the first site can see an image of the advisor on the screen of the computer system. This advisor can send the user present at the first site a tutorial if need be.

The memorizing of the settings parameters of the dispenser 11, once a given mixture has been considered satisfactory, may be commanded from the second site.

Advantageously, the dispensing system 10 is designed to be able to modify all the colours aesthetically for each zone if the person wishes to change the colour of his or her face. The dispensing system may be designed in such a way that the user has only to modify a single colour in one zone for the system to modify all the others. The dispensing system can for that use translations, for example by recording the colour saturation or shifting the shade.

The dispensing system may be designed to receive the map of somebody else, real or imaginary. It may also combine the map of the person with the map of another, in order to sublimate the makeup without losing the inherent characteristics.

The interface may be used to define makeup programs in which the order of the zones to make up is defined or the order of the colours to propose is defined.

EXAMPLES

A dispenser 11 like that illustrated in FIG. 3 is created. The dispenser is designed to communicate with a tablet 100 such as an iPad. This computer system executes an application named "µMix" developed in the specific Apple environment (XCode 4 and iOS simulator) in the Objective C language. It uses Foundation, UIKit and CoreGraphics basic frameworks which supply the tools for manipulating the data structures, computation tools and functionalities associated with the user graphics interface.

The application also uses the CoreBluetooth framework providing access to the Bluetooth 4 Low Energy peripherals, with the following main tasks:
  looking for Bluetooth 4.0 Low Energy peripherals,
  connection/disconnection and management of connection parameters,
  communication in read and/or write mode based on the GATT (Generic Attribute Profile) architecture.

The application proposes the following functionalities:
  definition of the fractions of base products,
  choice of mode of operation when pressing the control button 12, namely continuous, purge or dosed,
  display of a triangle of volumetric fraction as illustrated in FIG. 30 with management of the volumetric fraction by tactile touch on the triangle or using the +/− buttons associated with each product,
  Bluetooth connection/disconnection and real-time transfer of instructions to the dispenser,
  settings of flow rates in continuous mode, and of quantities in dosed mode,
  calculation, display and transfer to the dispenser of the volumetric fractions of products in real time, according to the instruction, with the sum of the fractions always equal to 100%,
  collection and display of the torques of the three motors in real time, and
  saving of the key parameters in a configuration file.

The continuous mode is a dispensing mode in which the mixture of the three base products is dispensed for as long as the user is pressing the dispensing button 12. The product is dispensed at a flow rate an estimate of which is displayed above the "Continuous" button 304. The choice of flow rate is made in a "Settings" menu.

The "dosed" mode is a mode of dispensing the mixture in doses in which the dose is delivered following a press of the user on the dispensing button 12. One press is enough and the user can then release the button. The overall dose of product dispensed is that indicated above the "Dosed" button 306, for example 0.1 ml. This volume can be altered in the "Settings" menu.

The "purge" mode is a dispensing mode in which a dose of mixture with equal volumetric fractions (33%) is delivered as soon as the user has pressed the dispensing button 12, as in the "dosed" mode. One press is enough and the user can then release the button. When the dose has been dispensed in full, the button may be released. If the button is released before the end, dispensing stops, even if the specified volume has not been achieved. The overall dose of product dispensed is that indicated above a "Purge" button 305, for example 3 ml. This volume can be altered in the settings menu.

The user determines the desired colour with the application run on the tablet and which calculates the fractions of the various products. The tablet communicates this value to the dispenser by a Bluetooth connection.

The electronics built into the dispenser 11 collects the information and automatically adjusts the flow rates of the three cartridges so as to obtain a mixture of the desired colour.

When the user wishes to use the product, he or she presses the button 12 of the dispenser in order to cause the product to be expelled. He or she presses for as long as he or she wants product, in "continuous" mode. In "dosed" mode, the user presses the button 12 once and the predefined dose is delivered.

Dispensing may be performed continuously, namely with the motors operating continuously, the entire volume being dispensed in one hit, or iteratively, the motors then operating in a pulse fashion; in that case, the space of time between two pulses allows the flow rate to be varied. Small volumes are dispensed one after another in several stages.

The pulses may for example be separated by intervals of 50 ms, 100 ms or 200 ms. The duration of a pulse during which the motor is turning will for example be from 50 to 150 ms.

The main page of the "μMix" application in this example comprises the following elements, as can be seen notably in FIG. 31:

status bar at the top of the screen: indicates the status of the Bluetooth connection or μMix if there is no Bluetooth connection;

thumbnails at the bottom of the screen: for selecting the active page: main page, settings, Bluetooth, products and favourites;

continuous button 304 for selecting the mode in which products are dispensed continuously;

purge button 305 for selecting the purge mode;

dosed button 306 for selecting the mode in which dispensing is in doses with the volume of the dose associated with the dosed button;

a blue ball 300 that the user can move around inside the volumetric triangle either by dragging it or using a double tap;

"−" buttons 302 for each product A, B and C: reduces the fraction of product selected moving along the straight line connecting the point to the vertex of the product selected;

"+" buttons 302 for each product A, B and C: increases the fraction of product selected moving along the straight line connecting the point to the vertex of the product selected;

volumetric fraction of each product as a percentage: can be modified by the user and updated in real time according to the instruction from the + and − buttons 302 and the position of the ball 300.

As the volumetric fractions are altered by moving the ball or using the + and − buttons, the values of the volumetric fractions of the products A, B and C are updated automatically. When the volumetric fractions are altered using the + and − buttons, the ball 300 is automatically moved into the corresponding position in the triangle.

When the application run on the tablet is started up, it automatically connects to the dispenser 11 if it is detected. When the dispenser is switched off or the Bluetooth connection is broken, the tablet disconnects. When the user moves the cursors that adjust the proportions of the products A and B, the values are transmitted in real time to the dispenser 11.

The settings page of the application contains the following elements:

status bar at the top of the screen: indicates the status of the Bluetooth connection or μMix if there is no Bluetooth connection;

thumbnails at the bottom of the screen: for selecting the active page: main page, settings, Bluetooth, or info;

"volumes" part with a text field to be filled in by the user to define the volume of the dose, in ml (2 ml for example) and a field for the purge volume, in ml (3 ml for example). The minimum doses in this example are 0.023 ml and the maximum doses are 9.90 ml (3×3.3 ml);

"flow rate" part with selection of the flow rate: fast (»0.03 ml/s), medium (»0.02 ml/s) or slow (»0.01 ml/s);

"dose" part with the choice of the iterative mixture, for dispensing a mixture of products in small volumes delivered one after another in several stages; otherwise the total volume of each product is dispensed in a single shot;

"triangle image" part to select the image of the triangle that will be displayed on the main page in order to be able to display a triangle with the colours dispensed by the dispenser 11. By using a "Choose image" button on the "Settings" page an album can be accessed.

The "Products" page of the application in the example in question comprises the following elements:

a choice of the value of each product in code step units from 0 to 1414.

Each unit corresponds to a dispensed product volume of 2.33 μl, which is the smallest quantity that the dispenser in this example can dispense; when this sheet is displayed, it is the values of products on this sheet that are transmitted in real time to the dispenser. As soon as the sheet is no longer displayed, the values sent to the dispenser are those of the main sheet with the triangle;

display of the motor torques for A, B and C in real time refreshed every 45 values.

The mode in which the products are dispensed is the iterative or direct dose mode according to the option chosen on the Settings page.

The "Favourites" page allows configurations to be saved into a file. It provides access in the example considered to 10 files, namely "Configuration 1" to "Configuration 10" in addition to the default file. These files record for example the following parameters:

fractions of products A, B and C,
purge volume,
dose volume,
fast, medium or slow flow rate,
dosed, purge or continuous mode,
continuous or iterative dispensing.

Several tests were carried out with the dispensing system according to the example given above.

Test 1

The system was tested with ten women using the outlet interface 110 comprising the cup 115. The system was set to continuous mode. All the women successfully made themselves up using the system, the vast majority of them obtaining a makeup look that they considered more aesthetically pleasing than usual. In particular, they were able to find a better shade and use the options provided by the dispenser to optimize the colour in various parts of their face.

They were notably easily able to:
1) Find shades that suited their face, by iterative testing.
2) Memorize one or more colours.

3) Use the dispensing system to dispense the colour or colours.

Test 2

The system was tested on two people (a man and a woman) to conceal a particular zone (blemishes on the neck of the man and a blemish on the forehead in the case of the woman). The system was set to dosed mode.

The same procedure was used as for test 1.

Test 3

The dispensing system was used with an airbrush, as illustrated in FIG. 24, using the outlet interface 110 provided for that purpose.

An entire face was successfully made up.

In one case, the makeup applied was one single colour.

In a second case, the makeup was applied using touches of one colour then finishing with another colour, thus changing the colour settings between the two.

In a third case, makeup was applied with the colour varied during the spraying, thus creating a graduated effect.

Test 4

In order to assess the feasibility of remote assistance, the following two experiments were conducted:

First of all, a consumer found her shade herself through an iterative process as described hereinabove regarding the mapping and learning process. Thus, she chose a colour, commanded the dispenser to deliver a corresponding mixture, made herself up with it, assessed the result and where applicable corrected the shade until she found the appropriate colour.

Next, a makeup artist found the shade by proceeding as above, performing all of the operations, possibly with the exclusion of applying the makeup.

Finally, the exercise was repeated giving the tasks of choosing the colour/evaluating the shade/correcting to a makeup artist operating remotely. The makeup artist is capable of choosing a suitable shade, but to perform the exercise remotely assumes that the makeup artist is capable of assessing how well the shade suits using a digital image acquisition/transmission/restitution system.

In one embodiment, the consumer and the makeup artist both had a tablet, for example an iPad, these being configured to be able to establish a remote communication. The consumer had the dispenser according to the invention and the makeup artist had the application for selecting the colour and remotely, for example via the Bluetooth connection, controlling the consumer's tablet. The consumer settled herself in a well lit location and placed the tablet on a support suitable for filming herself with the screen-side inbuilt camera without holding it. Advantageously, the support has additional lighting means, for example arrays of LEDs arranged all around its periphery or along two or three of its sides. The consumer and the makeup artist established the video communication so that the makeup artist could see the consumer applying the makeup. The consumer switched on the dispenser and connected it to her tablet. The consumer informed the makeup artist of which cartridges were inserted in the dispenser. As an alternative, the information is transmitted automatically to the application running on the makeup artist's tablet. After looking at the consumer's skin colouring, the makeup artist selected a first shade and remotely triggered the dispensing of a test dose. The consumer applies her makeup to a zone recommended by the makeup artist. Following application, the makeup artist assesses how well suited the shade is. If the shade appears suitable, he may then command the dispensing of a larger dose so that the face can be made up. If he does not feel the shade appropriate then he chooses another shade and repeats the operation until the correct result is obtained.

The successive tests carried out with the three cartridges are recorded in the faun of ratio triplets (% a; % b; % c) such that % a+% b+% c=100%.

One example of a test carried out on the same consumer using the three methods is described below.

In the case where it was the consumer herself who looked for the appropriate shade, the successive tests were as follows:

Test 1: 22% a+38% b+40% c
Test 2: 17.3% a+39.8% b+42.9% c
Test 3: 22% a+39.4% b+38.6% c In the case where it was a makeup artist in the presence of the consumer who looked for the appropriate shade, the tests were as follows:

Test 1: 23.6% a+52.2% b+24.2% c
Test 2: 28.4% a+40.5% b+31.1% c
Test 3: 23% a+38.5% b+38.5% c In the case where it was a makeup artist who looked for the shade remotely over a video link, the tests were as follows:

Test 1: 17.4% a+41.0% b+41.6% c
Test 2: 23% a+45.5% b+31.5% c
Test 3: 19% a+40.1% b+40.9% c The colour paths for arriving at the correct shade are not the same but the end results are fairly close and in all cases satisfactory to the consumer.

The consumer may also assist in validating how suitable the shade is so that the role of the advisor is above all to use his expertise in choosing the direction in which to modify the shade.

In an alternative form, the consumer applies her makeup virtually using suitable software, for example the software known by the reference makeup genius. In that case, the advisor sees the makeup result that she is looking for then helps her to obtain it by proceeding as described hereinabove.

Conversely, the shade found using the remote assistance process may be recorded and used as data for applying virtual makeup to the consumer using a simulator, for example the Makeup genius software.

Test 5

The dispensing system was used to produce bespoke compacts. A multicompartment support like the one illustrated in FIG. 47 was filled with a plurality of mixtures of different shades, delivered by the dispenser 11 in succession.

The invention is not limited to the described examples.

It is possible for example to modify the way in which the pistons are moved in the cartridges.

The expression "comprising a" is to be understood as being synonymous with "comprising at least one".

The invention claimed is:

1. A system for dispensing at least one makeup product and that can be manipulated in one hand, the system comprising:
   a cup; and
   a dispenser for filling the cup from a bottom of the cup with at least two base products, wherein:
   the cup is secured to the dispenser at least while the cup is being filled with the at least two base products;
   the system has several filling orifices for filling the cup with different base products from the at least two base products, the several filling orifices opening into the cup; and
   the dispenser allows the at least two base products to be delivered to the cup in adjustable proportions.

2. The system according to claim 1, wherein the cup is wider than the cup is deep.

3. The system according to claim 1, wherein the cup is detachable from the dispenser.

4. The system according to claim 1, wherein the bottom of the cup has an outwardly concave shape.

5. The system according to claim 1, wherein the cup is one of at least two cups that can be selectively fed from the dispenser.

6. The system according to claim 1, further comprising several cups associated with identifiers reminding a user of a zone of a face for which a mixture contained in a given cup one of the several cups is intended.

7. The system according to claim 5, wherein the cups are configured to move relative to the dispenser.

8. The system according to claim 1, further comprising a cover for closing the cup.

9. The system according to claim 1, wherein a volume of the cup is between 2 and 1000 mm$^3$.

10. The system according to claim 1, wherein the at least two base products delivered to the cup are foundations.

11. The system according to claim 1, wherein a largest inside diameter of the cup, or a largest inside diameter of an inscribed circle of the cup in a case in which the cup has a non-circular contour, is between 2 and 100 mm.

12. The system according to claim 1, wherein the cup does not have a mixer.

13. The system according to claim 1, further comprising the cat least two base products for filling the cup, a viscosity of the at least two base products being between 0.05 Pa·s and 50 Pa·s at 25° C. and 1 atm.

14. The system according to claim 1, wherein the dispenser allows at least three base products to be delivered to the cup in adjustable proportions.

15. The system according to claim 7, wherein the cups are carried by a mobile support that can rotate with respect to the dispenser, or by a slide capable of translational movement with respect to the dispenser.

16. The system according to claim 8, wherein the cover is transparent.

17. The system according to claim 11, wherein the largest inside diameter of the cup, or the largest inside diameter of the inscribed circle in the case in which the cup has the non-circular contour, is 5 to 40 mm.

18. A method for preparing a makeup product, the method comprising filling the cup of a dispensing system as defined in claim 1 with at least one base product from the dispenser.

19. A method for dispensing and evaluating makeup, the method comprising:
   allowing a video link to be established over the Internet from a camera at a first site to a second site;
   allowing the second site to operate either directly or indirectly the dispenser of a dispensing system according to claim 1, the dispenser being present at the first site and making it possible to vary the colour of a dispensed mixture of cosmetic products; and
   allowing a person present at the first site to apply the dispensed mixture and to send to the second site a corresponding image so as to receive in return information relating to a result of the makeup.

20. The method according to claim 19, wherein the second site has a viewing screen that allows an advisor sitting at the viewing screen to see the result of the makeup with the product dispensed by the dispenser and to advise the person who has applied the dispensed mixture.

21. The method according to claim 19, the video link between the first and second sites being a two-way link.

22. The method according to claim 19, which the method further comprising memorizing setting parameters of the dispenser once a given mixture is considered to be satisfactory.

23. The method according to claim 22, wherein the memorizing is controlled from the second site.

24. The method according to claim 19, wherein the camera (i) is integrated in a tablet, a smartphone, a camera phone, or a micro-computer or (ii) is a web cam connected to a computer.

25. The method according to claim 19, wherein a computer system for operating the dispenser is at the first site.

26. The method according to claim 25, wherein the computer system operates the dispenser via a wi-fi or Bluetooth link.

* * * * *